(12) United States Patent
Ahmad et al.

(10) Patent No.: US 8,806,606 B2
(45) Date of Patent: Aug. 12, 2014

(54) SERVICE AGGREGATION IN A CLOUD SERVICES CENTER

(75) Inventors: Syed A. Ahmad, Ashburn, VA (US); Juzer T. Kopti, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 159 days.

(21) Appl. No.: 13/407,470

(22) Filed: Feb. 28, 2012

(65) Prior Publication Data

US 2013/0227670 A1  Aug. 29, 2013

(51) Int. Cl.
*H04L 9/00* (2006.01)

(52) U.S. Cl.
USPC ............ 726/11; 726/12; 726/13; 726/14; 726/15

(58) Field of Classification Search
USPC .......................... 726/8–11, 11–15
See application file for complete search history.

(56) References Cited

U.S. PATENT DOCUMENTS

| | | | |
|---|---|---|---|
| 8,532,108 B2* | 9/2013 | Li et al. | 370/392 |
| 2011/0208606 A1* | 8/2011 | Hadar et al. | 705/26.2 |
| 2013/0103834 A1* | 4/2013 | Dzerve et al. | 709/225 |

* cited by examiner

*Primary Examiner* — Ghazal Shehni

(57) ABSTRACT

A cloud center infrastructure system may include a service aggregator connected directly to a provider network. The service aggregator may be configured to receive, via the provider network, a data unit from a customer device, associated with a customer; identify a first device, associated with a first traffic processing service, based on a sequence of traffic processing services associated with the customer; and send the data unit to the first device, wherein the first device is located in a cloud services center, and wherein the first device is connected to the service aggregator over a Layer 2 connection.

29 Claims, 15 Drawing Sheets

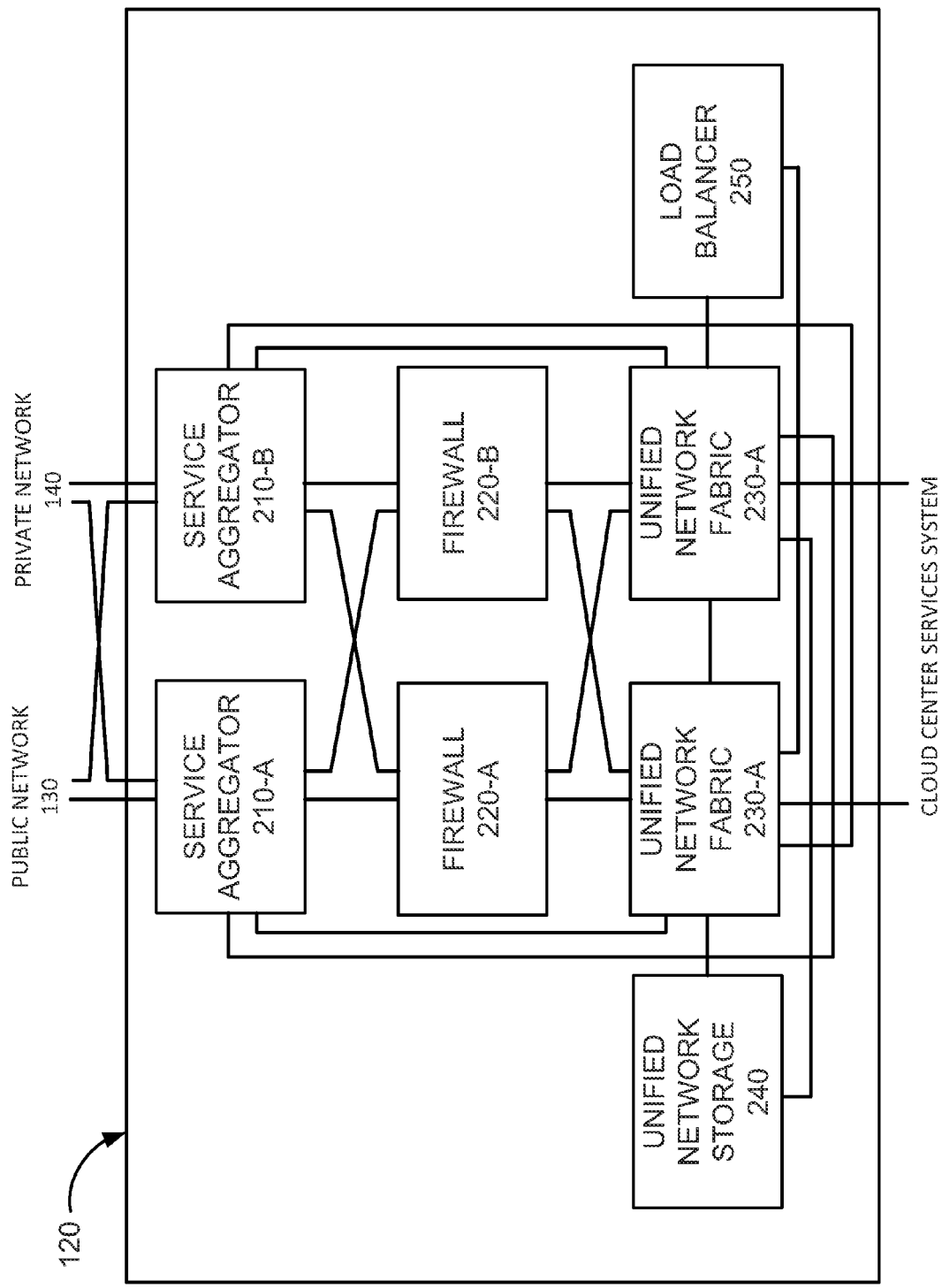

FIG. 6

540 — Table

F = REQUIRED FOR FIRST SITE
R = REQUIRED
O = OPTIONAL

| | LAYER 2 DOMAIN | VRF | VR | GRE TUNNEL | IPSEC TUNNEL | GRE TUNNEL OVER L3VPN | IPSEC TUNNEL OVER L3VPN | VLAN TAGGED L2 INTERFACE | VLAN TAGGED L3 INTERFACE | ACCESS ROUTING | CUSTOMER SERVICES L3 INTERFACE | SERVICE L2 INTERFACE | SERVICE ROUTING |
|---|---|---|---|---|---|---|---|---|---|---|---|---|---|
| PUBLIC IP MPLS TRANSPORT 610 | F | F | | | | | | | | | F | R | O |
| PUBLIC IP GRE TUNNEL 612 | F | F | | R | | | | | | | F | R | O |
| PUBLIC IP IPSEC TUNNEL 614 | F | F | | | R | | | | | | F | R | O |
| PUBLIC IP IPSEC TUNNEL OVER L3VPN 616 | F | F | F | | | | R | | | | F | R | O |
| PRIVATE IP VLAN L3 INTERFACE 620 | F | | F | | | | | | R | R | F | R | O |
| PRIVATE IP GRE TUNNEL OVER L3VPN 622 | F | | F | | | R | | | R | R | F | R | O |
| PRIVATE IP IPSEC TUNNEL OVER L3VPN 624 | F | | F | | | | R | | R | R | F | R | O |
| SECURE GATEWAY VLAN L3 INTERFACE 630 | F | | F | | | | | | F | F | F | R | O |
| VLAN TAGGED L2 INTERFACE 640 | F | | | | | | | R | | | | R | |
| CPA VLAN TAGGED L3 INTERFACE 650 | F | | F | | | | | | | | F | R | O |
| CPA GRE TUNNEL OVER L3VPN 652 | F | | F | | | R | | | | | F | R | O |
| CPA IPSEC TUNNEL OVER L3VPN 654 | F | | F | | | | R | | | | F | R | O |
| CPA VLAN TAGGED L2 INTERFACE 656 | F | | | | | | | R | | | | R | |

SERVICE AGGREGATION IN A CLOUD SERVICES CENTER

BACKGROUND INFORMATION

A provider of communication services may offer cloud computing services via a cloud computing center. Cloud computing may refer to the delivery of computing as a service, rather than as a product, through the use of resources available over the provider's network. For example, a customer may purchase an email service, a storage service, a traffic filtering service, and/or another type of service. The purchased services may be hosted at a cloud services center, which may not be part of the provider's network. For example, the cloud services center may be connected to a gateway router, located on the provider's network, through another router. The customer's traffic may need to be routed through the gateway router and the other router to access the purchased services, which may be inefficient.

BRIEF DESCRIPTION OF THE DRAWINGS

FIG. 2B is a diagram illustrating exemplary components of a second implementation of the cloud center infrastructure system of FIG. 1;

FIG. 6 is a diagram of exemplary components that may be stored in the configuration table of FIG. 5;

DETAILED DESCRIPTION OF PREFERRED EMBODIMENTS

Figure 1:
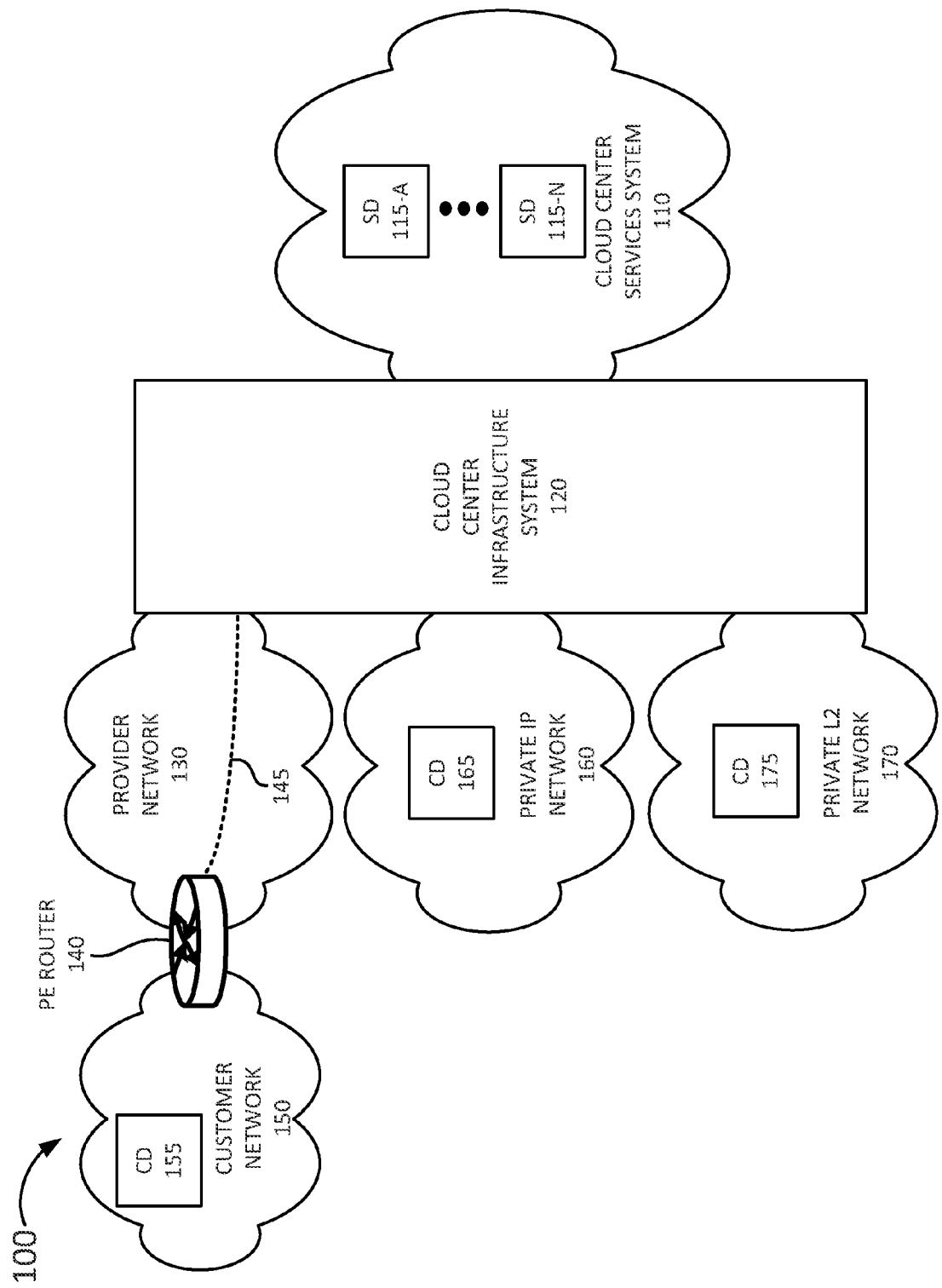
FIG. 1 is a diagram illustrating an exemplary environment according to an implementation described herein.

The following detailed description refers to the accompanying drawings. The same reference numbers in different drawings identify the same or similar elements.

An implementation described herein may relate to a cloud services center that provides services for cu via a provider network. The cloud services center may be accessible via a service aggregator device. The service aggregator device may be located on the provider's network and may, therefore, be directly reachable to a customer. Furthermore, the customer may access the cloud services center, via the service aggregator, using a variety of access methods. For example, a customer may connect to the provider network with a customer edge router and the customer edge router may send traffic to the service aggregator via a tunnel, such as a Multi-Protocol Label Switching (MPLS) tunnel, a Generic Routing Encapsulation (GRE) tunnel, and/or an Internet Protocol Security (IPSec) tunnel; via an Ethernet connection; via a Virtual Local Area Network (VLAN) connection; and/or another type of connection. The service aggregator may connect to devices in the cloud services center using a Layer 2 connection. Thus, the service aggregator may act as both a Layer 3 (L3) device and a Layer 2 (L2) device and may enable a customer to access the cloud services center without additional Layer 3 hops.

In one implementation, a pair of service aggregators may connect directly to the cloud services center (e.g., to particular devices in the cloud services center associated with particular services). In another implementation, a pair of service aggregators may be part of an access infrastructure that includes one or more firewalls, one or more network fabric devices, a load balancer device, and/or a storage device. In yet another implementation, a pair of service aggregators may include the functionality of the entire access infrastructure by performing the functions of the one or more firewalls, the one or more network fabric devices, the load balancer device, and/or the storage device.

An implementation described herein may further relate to enabling a customer to select a particular access method, or to select multiple access methods, from a list of available access methods. The service aggregator may be configured based on the selected access method. For example, the service aggregator may be configured using a domain configuration associated with the selected access method and an access interface of the service aggregator may be configured based on the selected access method. Furthermore, a customer services interface and/or service routing may be configured in the service aggregator for the customer based on the selected access method.

Moreover, the service aggregator may perform Layer 2 and/or Layer 3 traffic separation by keeping traffic from different customers separate. Layer 2 and Layer 3 may refer to the data link layer and the network layer in the Open Systems Interconnection (OSI) model. The service aggregator may perform traffic separation by generating a separate Layer 2 domain (L2D) and/or a separate routing instance for each customer. An L2D may associate a particular interface and a particular L2D tag with the customer. For example, a data unit may include an L2D tag and may be received via a particular interface assigned to the L2D. The data unit may be identified as being associated with the L2D based on being received via the particular interface and based on including the L2D tag.

A routing instance may include a routing table associated with a particular customer, a forwarding, table derived from the routing table, a set of interfaces that use the derived forwarding table, a set of routing protocols and networking devices that provide information to the routing instance or that receive information from the routing instance, and/or other information associated with routing and/or forwarding traffic for the particular customer. Thus, data units associated with a first customer may be routed and/or forwarded differently from data units associated with a second customer.

Furthermore, the service aggregator may aggregate services for the customer, stitch the services into a particular sequence of services, and implement the services within a particular cloud services center. Thus, for example, rather than having traffic routed through multiple locations in order to process traffic associated with the customer, the customer's traffic may be routed to the cloud services center, where the services may be performed on the customer's traffic without requiring any Layer 3 hops. For example, a data unit, associated with the customer, may be received at the service aggregator and may be sent to a first device in the cloud services center over a Layer 2 connection. The first device may process the data unit based on a first traffic processing service, send the processed data unit back to the service aggregator and the service aggregator may send the data unit to a second device in the cloud services center over a Layer 2 connection. The second device may process the data unit based on a second traffic processing service and send the processed data unit back to the service aggregator. The service aggregator may continue this process until all traffic processing services are performed on the data unit and may then send the data unit to a destination. The service aggregator may determine a sequence of devices to which to send the data unit for processing by, for example, accessing a routing instance associated with the customer.

A customer, as the term is used herein, may refer to particular entity (e.g., a company, network, individual, etc.) associated with an account, and/or may refer to a particular technological unit associated with the particular entity (e.g., a circuit of a particular bandwidth). Thus, for example, a company may purchase ten circuits, and each of the ten circuits may be referred to as a customer, for the purposes of this description.

FIG. 1 is a diagram of an exemplary environment 100 in which the systems and/or methods described herein may be implemented. As shown in FIG. 1, environment 100 may include a cloud center services system 110, a cloud center infrastructure system 120, a provider network 130, a provider edge (PE) router 140, a customer network 150, a private IP network 160, and a private L2 network 170. While FIG. 1 shows a single cloud center services system 110, a single a cloud center infrastructure system 120, a single provider network 130, a single PE router 140, a single customer network 150, a single private IP network 160, and a single private L2 network 170 for illustrative purposes, in practice, environment 100 may include multiple cloud center services systems 110, multiple cloud center infrastructure systems 1120, multiple provider networks 130, multiple PE routers 140, multiple customer networks 150, multiple private IP networks 160, or multiple private L2 networks 170.

Cloud center services sys 110 may include one or more service devices (SD) 115-A to SD 115-N (referred to herein collectively as "service devices 115" and individually as "service device 115"). Service device 115 may include one or more server devices and/or storage devices, which provide cloud services for customers. Service device 115 may connect to cloud center infrastructure system 120 with a Layer 2 connection or with a Layer 3 connection.

As an example, cloud center services system 110 may include one or more service devices 115 that provide computing as a service. Computing as a service may enable a customer to use computing resources of the cloud center services system 110 to perform data processing computations. As another example, cloud center services system 110 may include one or more service devices 115 that provide cloud storage. Cloud storage may enable a customer to store data in storage devices associated with cloud center services system 110.

As yet another example, cloud center services system 110 may include one or more service devices 115 that provide a hosted voice over Internet Protocol (VoIP) service. A hosted VoIP service may act as a virtual switchboard for a customer's internal telephone system. As yet another example, cloud center services system 110 may include one or more service devices 115 that provide a Network Address Translation (NAT) service. A NAT service may translate IP addresses. For example, the NAT service may translate an IP address from a private IP network to a public IP network. For example, the NAT service may translate an IP version 4 (IPv4) address to another IPv4 address, may translate an IPv4 address to an IP version 6 (IPV6) address, and/or may translate an IPv6 address to an IPv6 address.

As yet another example, cloud center services system 110 may include one or more service devices 115 that manage a Virtual Private Network (VPN) service. A VPN service may enable multiple remote end-points to access a customer's network. As yet another example, cloud center services system 110 may include one or more service devices 115 that manage a Virtual Private LAN Service (VPLS). A VPLS may include a multi-point VPN that may enable the customer's sites to appear as if on a same LAN and may be able to transport non-IP traffic by using psendowires between the sites (e.g., by implementing MPLS tunnels between the sites).

As yet another example, cloud center services system 110 may include one or more service devices 115 that provide a Distributed Denial of Service (DDOS) detection and/or mitigation service. A DDOS detection service may detect DDOS attacks and a DDOS mitigation service may mitigate DDOS attacks by dropping packets that are detected as being part of a DDOS attack. As yet another example, cloud center services system 110 may include one or more service devices 115 that provide a firewall service for a customer's network and/or for a particular application associated with a customer. A firewall may apply a particular filter to data units associated with the customer and may drop data units that do not satisfy the particular filter. As yet another example, cloud center services system 110 may include one or more service devices 115 that provide an Intrusion Detection and Prevention System (IDPS). An IDPS may use a fingerprinting service to match data patterns against known attacks. If one or more data units match a known attack, the one or more data units may be dropped and the customer may be alerted.

As yet other examples, cloud center services system 110 may include one or more service devices 115 that provide an email filter, a filter for a particular web site, a load balancing service, a video distribution service, a lawful intercept service on behalf of a law enforcement entity, and/or any other type of service that be provided by cloud center services system 110.

Cloud center infrastructure system 120 may include one or more devices that are part of provider network 130, that connect cloud center services system 110 to provide network 130, and that enable a customer to access cloud center services system 110 via provider network 130. Example implementations of cloud center infrastructure system 120 are described below with reference to FIGS. 2A and 2B.

Provider network 130 may include a public IP packet-switched network, a circuit-switched network, or a combination thereof. For example, provider network 130 may include a local area network (LAN), a wide area network (WAN), a metropolitan area network (MAN), an ad hoc network, an intranet, a fiber optic-based network (e.g., a fiber optic service network), a wireless network (e.g., a cellular network, the Public Land Mobile Network (PLMN), a second generation (2G) network, a third generation (3G) network, a fourth generation (4G) network (e.g., a long term evolution (LIE) network), a fifth generation (5G) network, a code division multiple access (CDMA) network, a global system for mobile communications (GSM) network, a general packet radio services (GPRS) network, a combination of thereof), and/or a combination of these or other types of networks. In one implementation, provider network 130 may correspond to a Border Gateway Protocol (BGP) autonomous system and PE router 140 and cloud center infrastructure system 120 may function as edge routers. In another implementation, provider network 130 may include more than one BGP autonomous system.

Provider edge (PE) router 140 may include a provider edge device that connects customer network 150 to provider network 130 through a customer edge (CE) device. Customer network 150 may include a network associated with a customer. Customer network 150 may include customer device 155.

Customer device 155 may include any device with a communication function, such as, for example, a personal computer or workstation; a server device; a portable computer; a printer, fax machine, or another type of physical medium output device; a television, a projector, a speaker, or another type of a display or audio output device; a set-top box; a gaming system; a camera, a video camera, a microphone, a sensor, or another type of input or content recording device; a portable communication device (e.g. a mobile phone, a smart phone, a tablet computer, a global positioning of system (GPS) device, and/or another type of wireless device); a voice over Internet Protocol (VoIP) telephone device; a radiotelephone; a gateway, a router, a switch, a firewall, a network interface card (NIC), a hub, abridge, a proxy server, or another type of firewall device; a line terminating device, such as an add-drop multiplexor or an optical network terminal; a cable modem; a cable modem termination system; and/or any type of device with communication capability.

Customer device 155 may connect to a CE router (not shown in FIG. 1) in customer network 150 using any Layer 2 or Layer 3 technology employed by the customer in customer network 150 and the CE router may connect to PE router 140. The provider may provider a connection 145 from PE router 140 to cloud center infrastructure system 120. Connection 145 may be implemented using an access technique selected by the customer. For example, connection 145 may correspond to an MPLS tunnel, a GRE tunnel, and/or an IPSec tunnel.

Private network 160 may include a private IP packet-switched network, a private circuit-switched network, or a combination thereof. Private network 160 may include customer device 165. Customer device 165 may include a device analogous to customer device 155. Customer device 165 may connect to cloud center infrastructure system 120 using any access technique employed by private network 160. For example, customer device 160 may connect to cloud center infrastructure system 120 using a private IP MPLS tunnel, a private IP GRE tunnel, a private IP IPSec tunnel, and/or any other type of connection used by private network 160.

Private network 170 may include a private Layer 2 network that connects directly to cloud center infrastructure system 120 (e.g., via an L2 interface). In one implementation, private L2 network 170 may include an Ethernet network. In another implementation, private L2 network 170 may include another type of Layer 2 network, such as an Asynchronous Transfer Mode (ATM) network or a Frame Relay network. Private L2 network 170 may include customer device 175. Customer device 175 may include a device analogous to customer device 155. Customer device 175 may connect to cloud center infrastructure system 120 using a Layer 2 connection.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2A:
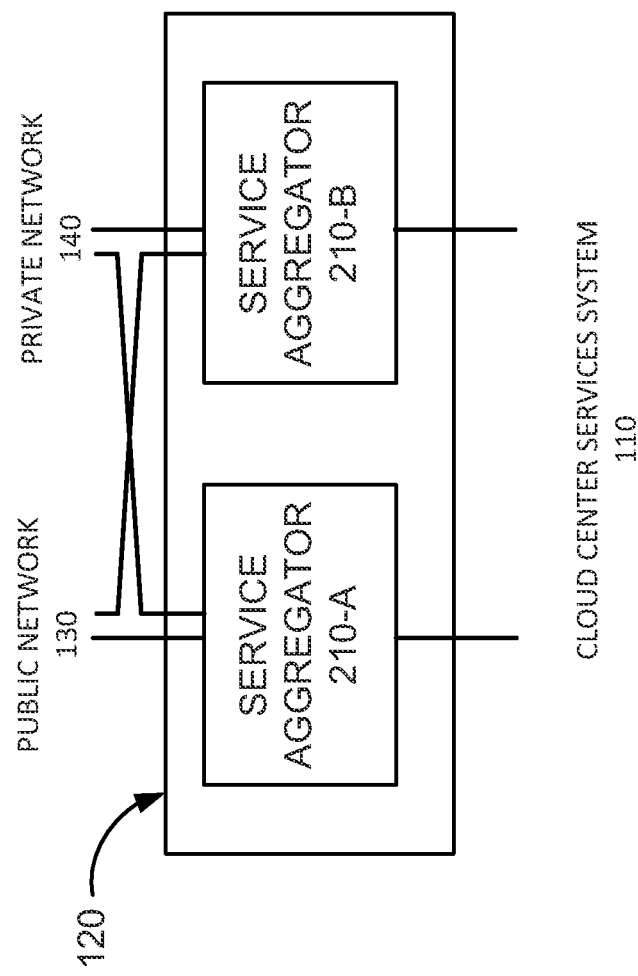
FIG. 2A is a diagram illustrating exemplary components of a first implementation of the cloud center infrastructure system of FIG. 1.

FIG. 2A is a diagram illustrating exemplary components of a first implementation of cloud center infrastructure system 120. As shown in FIG. 2A, cloud center infrastructure system 120 may include a service aggregator 210-A and a service aggregator 210-B (referred to herein collectively as "service aggregators 210" and individually as "service aggregator 210"). While FIG. 2A depicts two service aggregators 210, in another implementation, cloud center infrastructure system 120 may include fewer or more service aggregators 210.

Service aggregator 210 may include a device that functions as both a Layer 3 (network layer) device and a Layer 2 (data link layer) device in the OSI model. For example, service aggregator 210 may enable customer device 155 to connect to service aggregator 210, using connection 145, over a Layer 3 connection. As another example, service aggregator 210 may enable customer device 165 to connect to service aggregator 210 over a Layer 3 connection or over a Layer 2 connection. Furthermore, service aggregator 210 may connect to devices in cloud center services system 110 over a Layer 2 connection. Thus, service aggregator 210 may act as a provider edge router with respect to provider network 130, may act as either a router or a switch with respect to private network 160, and may act as a switch with respect to devices associated with cloud center services system 110.

Service aggregator 210 may perform traffic separation by keeping traffic associated with a first customer separate from traffic associated with a second customer. Service aggregator 210 may perform traffic separation by maintaining a separate routing instance for each customer. Service aggregator 210 may aggregate traffic processing services, and/or other services available via cloud center services system 110, and may stitch the traffic processing services into a particular sequence. Service aggregator 210 may aggregate and stitch traffic processing services using a routing instance, associated with the customer, in connection with service interfaces set up for the customer. The service interfaces may forward traffic, associated with the customer, to particular devices in cloud center services system 110 in a particular sequence, wherein each of the particular devices performs a particular traffic processing service.

FIG. 2B is a diagram illustrating exemplary components of a second implementation of cloud center infrastructure system 120. As shown in FIG. 2B, cloud center infrastructure system 120 may include service aggregator 210-A, service aggregator 210-B, a firewall 220-A and a firewall 220-B (referred to herein collectively as "firewalls 220" and individually as "firewall 220"), a unified network fabric 230-A and a unified network fabric 230-B (referred to herein collectively as "unified network fabrics 230" and individually as "unified network fabric 230"), a unified network storage device 240, and a toad balancer 250.

While FIG. 2B depicts two service aggregators 210, two firewalls 220, two unified network fabrics 230, one unified network storage device 240, and one load balancer 250, in another implementation, cloud center infrastructure system 120 may include fewer or more service aggregators 210, firewalls 220, unified network fabrics 230, unified network storage devices 240, and/or one load balancers 250.

Firewall 220 may include one or more devices that may protect cloud center services system 110 from unauthorized access. For example, firewall 220 may include filters that may drop data units that are not associated with an authorized source, are not associated with an authorized protocol, and/or may perform another action on a data unit based on a filter. Firewall 220 may differ from a firewall device in cloud center services system 110, which provides firewall as a service to customers associated with cloud center services system 110.

Unified network fabric 230 may perform switching functions for cloud center services system 110. For example, unified network fabric 230 may provide a Layer 2 connection between service aggregator 210 and between devices in cloud center services system 110. Thus, whereas in the implementation of FIG. 2A, service aggregator 210 may perform routing and switching functions for cloud center infrastructure system 120, in the implementation of FIG. 2B, at least some of the switching functionality of service aggregator 210 may offloaded to unified network fabric 230.

Unified network storage device 240 may include one or more devices that store information associated with cloud center infrastructure system 120. For example, unified network storage device 240 may store configuration information associated with service aggregator 210, firewall 220, unified network fabric 230, and/or load balancer 250. As another example, unified network storage device 240 may maintain information about conditions associated with cloud center services system 110, such as available bandwidth, memory use, number of allowed data units, number of dropped data units, and/or any other condition associated with cloud center services system 110.

Load balancer 250 may include one or more devices that perform load balancing for cloud center services system 110. For example, load balancer 250 may balance traffic flow and/or computing resources between service aggregator 210-A and service aggregator 210-B, between firewall 220-A and firewall 220-B, and/or between unified network fabric 230-A and unified network fabric 230-B.

Although FIGS. 2A and 2B show exemplary components of cloud center infrastructure system 120, in other implementations, cloud center infrastructure system 120 may include fewer components, different components, differently arranged components, or additional components than depicted in FIG. 2A or 2B. Additionally or alternatively, one or more components of cloud center infrastructure system 120 may perform functions described as being performed by one or more other components of cloud center infrastructure system 120.

For example, in another implementation, the components of FIG. 2B may be included in service aggregator 210 as functional components. In other words, service aggregators 210 may be configured to perform the functionality of firewall 220, unified network fabric 230, unified network storage 240, and/or toad balancer 250.

Figure 3:
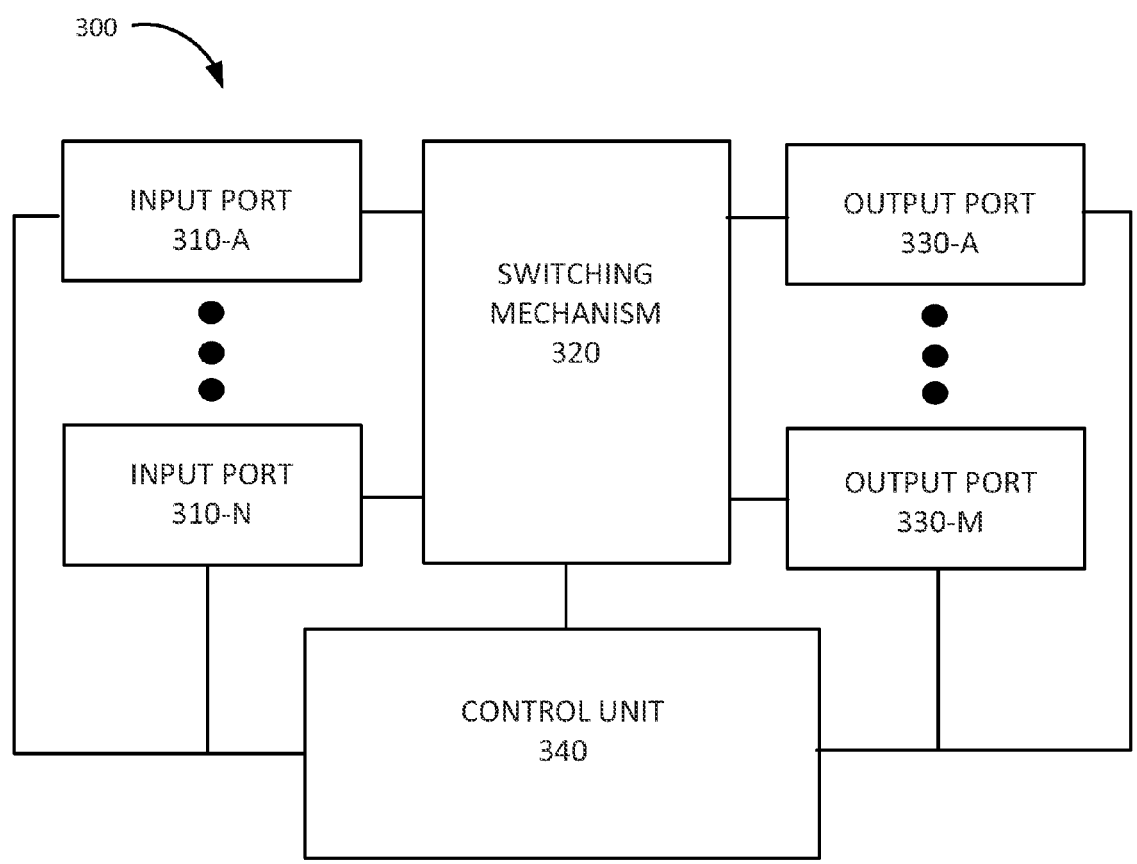
FIG. 3 is a diagram illustrating exemplary components of the service aggregator of FIG. 2A or 2B.

FIG. 3 is a diagram illustrating example components of service aggregator 210. As shown in FIG. 3, service aggregator 210 may include one or more input ports 310-A to 310-N (referred to herein individually as "input port 310" and collectively as "input ports 310"), a switching mechanism 320, one or more output ports 330-A to 330-M (referred to herein individually as "output port 330" and collectively as "output ports 330"), and/or a control unit 340.

Input ports 310 may be the points of attachments for physical links and may be the points of entry for incoming traffic. An input port 310 may be associated with an interface card.

Input port 310 may perform some or all of data plane processing associated with an incoming packet. Data plane processing may encompass looking up a destination address for an incoming packet, removing or changing a label associated with the packet, determining a path through switching mechanism 320, and/or filter the packet based on one or more firewall filters.

Switching mechanism 320 may include one or more switching planes and/or fabric cards to facilitate communication between input ports 310 and output ports 330. In one implementation, each of the switching planes and/or fabric cards may include a single or multi-stage switch of crossbar elements. In another implementation, each of the switch ng planes may include some other form(s) of switching elements. Additionally or alternatively, switching mechanism 320 may include one or more processors, one or more memories, and/or one or more paths that permit communication between input ports 310 and output ports 330.

Output ports 330 may store traffic received from input ports 310 and may schedule the traffic on one or more output physical links. An output port 330 may be associated with an interface card. Output port 330 may perform some or all of data plane processing associated with ar outgoing packet. For example, output port 330 truly classify the packet based on a quality of service class, schedule the packet in a particular queue, add or change a label associated with the packet, and/or filter the packet based on one or more firewall filters.

Control unit 340 may interconnect with input ports 310, switching mechanism 320, and/or output ports 330 and may control operation of service aggregator 210. For example, control unit 340 may perform control plane operations associated with service aggregator 210 (e.g., control unit 340 may use routing protocols and may create one or more routing tables and/or one or more forwarding tables that are used in traffic forwarding).

Although FIG. 3 shows example components of service aggregator 210, in other implementations, service aggregator 210 may include fewer components, different components, differently arranged components, and/or additional components than depicted in FIG. 3. Additionally or alternatively, one or more components of service aggregator 210 may perform one or more tasks described as being performed by one or more other components of service aggregator 210.

Figure 4:
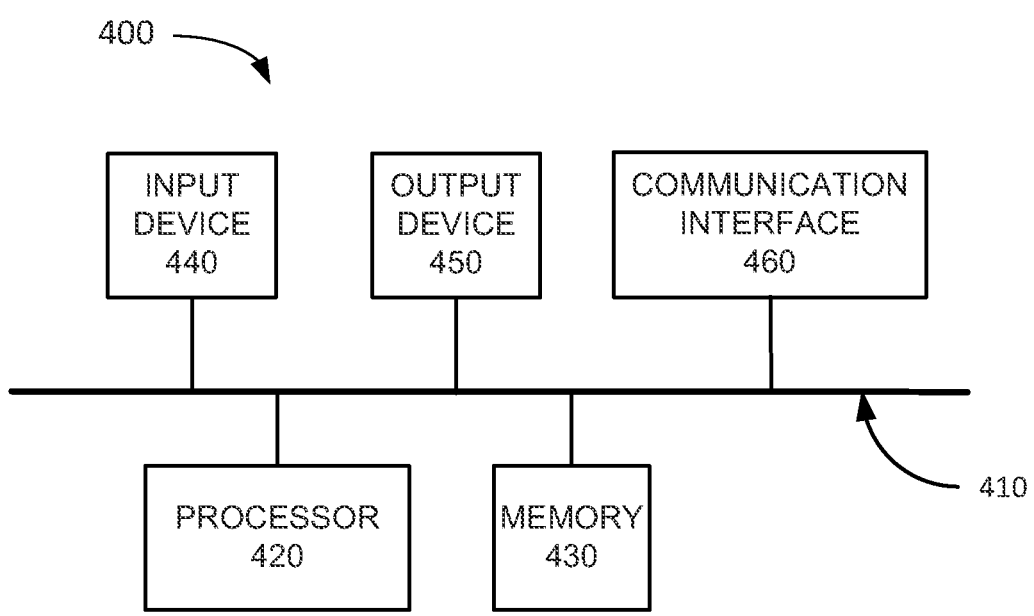
FIG. 4 is a diagram illustrating exemplary components of a device that may be included in one or more components of FIG. 1.

FIG. 4 is a diagram illustrating exemplary components of a device 400 according to an implementation described herein. Cloud center services system 110, service aggregator 210 control unit 340 of service aggregator 210), firewall 220, unified network fabric 230, unified network storage 240, load balancer 250, customer device 145, gateway router 150, and/or customer device 165 may each include one or more devices 400. As shown in FIG. 4, device 400 may include a bus 410, a processor 420, a memory 430, an input device 440, an output device 450, and a communication interface 460.

Bus 410 may include a path that permits communication among the components of device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into device 400. Input device 440 may include, for example, a keyboard, a mouse, a pen, a microphone, a remote control, an audio capture device, an image and/or video capture device, a touch-screen display, and/or another type of input device. In some embodiments, device 400 may be managed remotely and may not include input device 440. In other words, device 400 may be "headless" and may not include a keyboard, for example.

Output device 450 may output information to an operator of device 400. Output device 450 may include a display, a printer, a speaker, and/or another type of output device. For example, device 400 may include a display, which may include a liquid-crystal display (LCD) for displaying information. In some embodiments, device 400 may be managed remotely and may not include output device 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc., wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to radio frequency (RF) signals and/or a receiver that converts RF signals to baseband signals. Communication interface 460 may be coupled to an antenna for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 400 may perform certain operations relating to enabling a customer to access cloud center services system 110 without requiring a Layer 3 hop from a provider's network, enabling a customer to access cloud center services system 110 using multiple access methods, aggregating multiple cloud center services together for the customer, stitching the multiple cloud center services together in a particular sequence, and/or keeping traffic, associated with different customers accessing cloud center services, separate.

Device 400 may perform these operations in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than depicted in FIG. 4. Additionally or alternatively, one or more components of device 400 may perform one or more tasks described as being performed by one or more other components of device 400.

Figure 5:
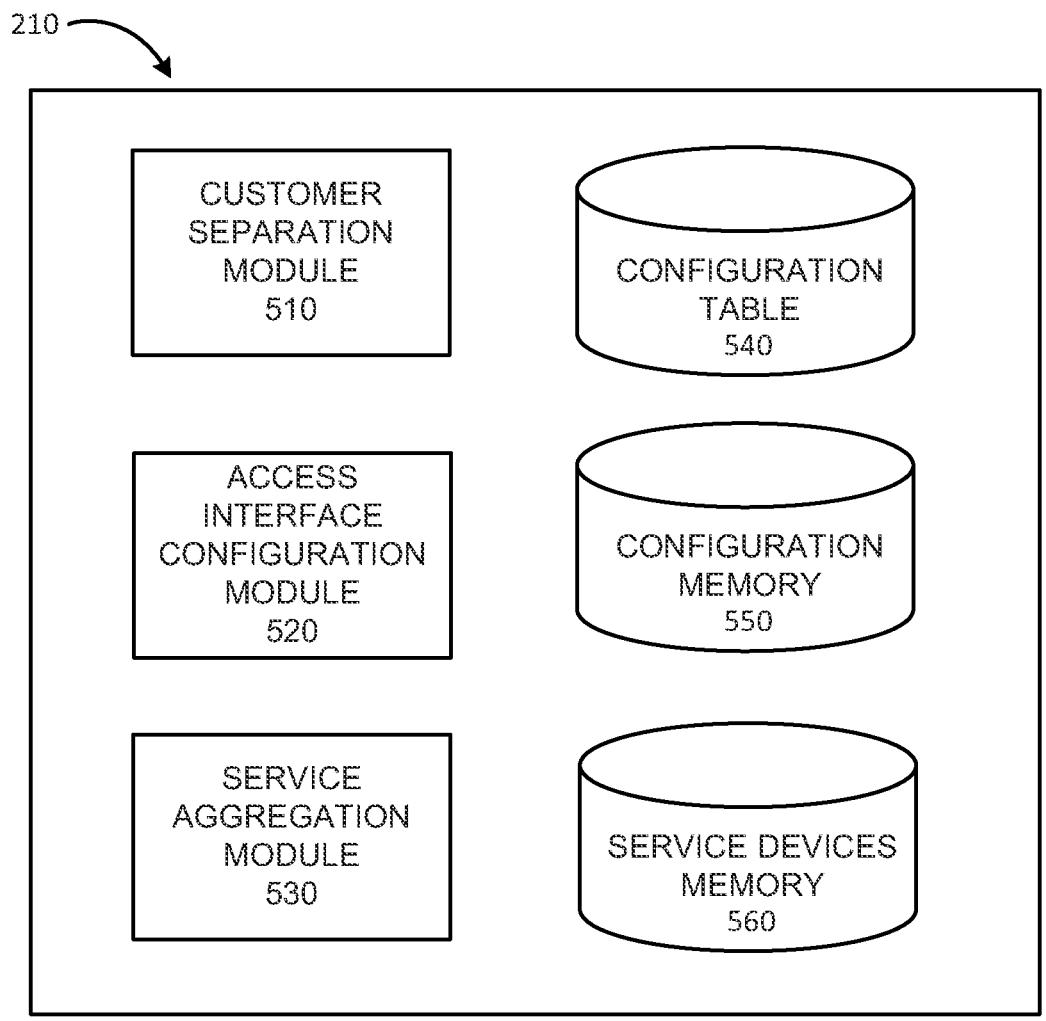
FIG. 5 is a diagram illustrating exemplary functional components of the service aggregator of FIG. 2A or 2B.

FIG. 5 is a diagram of exemplary functional components of service aggregator 210. The functional components of service aggregator 210 may be implemented, for example, via processor 420 executing instructions from memory 430. As shown in FIG. 5, service aggregator 210 may include a customer separation module 510, an access interface configuration module 520, a service aggregation module 530, configuration table 540, a configuration memory 550, and a service devices memory 560.

Customer separation module 510 may enable traffic for different customers to be managed differently. For example, customer separation module 510 may generate a level two domain for the customer and/or may generate a routing instance for the particular customer. A routing instance may include a routing table and/or a forwarding table associated with the particular customer. Moreover, customer separation module 510 may also set up service routing between service aggregator 210 and a routing device associated with the customer (e.g., PE router 140). Service routing may enable service aggregator 210 and the routing device, associated with the customer, to exchange routing information. For example, service aggregator 210 and the routing device, associated with the customer, may exchange BGP packets over an MPLS tunnel set up between service aggregator 210 and the routing device associated with the customer.

Access interface configuration module 520 may configure a particular access interface of service aggregator 210 associated with the particular customer. For example, access interface configuration module 520 may configure a particular access interface for a particular access method, such as MPLS transport, a GRE tunnel, an IPSec tunnel, Layer 3 VLAN, Layer 2 VLAN, and/or any other type of access method.

Service aggregation module 530 may aggregate services associated with the particular customer and may stitch the services into a particular sequence. For example, service aggregation module 530 may generate a customer service interface for a particular service purchased by the customer, and may associate the customer service interface with the routing instance associated with the customer. The customer service interface may be further associated with a device, located in cloud center services system 110, that is associated with the particular service.

Configuration table 540 may store information about particular configurations that are to be generated based on a particular access method. Exemplary components of configuration table 540 are described below with reference to FIG. 6. Configuration memory 550 may store configurations associated with particular customers. Exemplary components of configuration memory 550 are described below with reference to FIG. 7.

Service devices memory 560 may store information about particular service devices 115 associated with particular services. Service aggregation module 530 may identify a device (and/or a service interface) associated with a particular traffic processing service by accessing service devices memory 560. Furthermore, service device aggregation module 530 may receive a service advertisement message (e.g., indicating a new service device, a service device failure, a change in service device reachability, etc.) about a particular service device 115 and may update service devices memory 560 based on the received advertisement message.

Service devices memory 560 may associate a particular service available via cloud center services system 110, with one or more service devices 115 located in cloud center services system 110, or located in another cloud center services system 110. Furthermore, service devices memory 560 may include a sequence in which particular service devices 115 are to be accessed. For example, a particular service (e.g., a firewall service) may be associated with a first service device 115, designated as the primary service device, and a second service device 115, designated as a backup service device. If the primary service device cannot be reached, or if a service advertisement message is received indicating that the primary service device has failed, the backup service device may be used. Furthermore, conditions may be associated with particular service devices 115. For example, a condition may indicate that if traffic associated with the first service device 115 exceeds a particular threshold, additional traffic should be sent to the second service device 115. A condition associated with a particular service device 115 in service devices memory 560 may be incorporated in a policy assigned to a service interface associated with the particular service device 115.

Although FIG. 5 shows exemplary functional components of service aggregator 210, in other implementations, service aggregator 210 may include fewer functional components, different functional components, differently arranged functional components, or additional functional components than depicted in FIG. 5. Additionally or alternatively, one or more functional components of service aggregator 210 may perform functions described as being performed by one or more other functional components of service aggregator 210.

FIG. 6 is a diagram illustrating exemplary components that may be stored in configuration table 550. As shown in FIG. 6, configuration table 550 may relate particular access methods to particular configurations of service aggregator 210. For example, configuration table 550 may compare a particular access method to a domain configuration, may compare a particular access method to an access interface configuration, and/or may compare a particular access method to a particular customer services interfaces configuration.

Configuration table 550 may include a public IP MPLS transport entry 610, a public IP GRE tunnel entry 612, a public IP IPSec tunnel try 614, a public IP IPSec tunnel over Layer 3 VPN (L3VPN) entry 616, a private IP VLAN Layer 3 (L3) interface entry 620, a private IP GRE tunnel over L3VPN entry 622, a private IP IPSec tunnel over L3VPN entry 624, a secure gateway VLAN L3 interface entry 630, a VLAN tagged Layer 2 (L2) interface entry 640, a Converged Packet Access (CPA) VLAN tagged L3 interface entry 650, a CPA GRE tunnel over L3VPN entry 652, a CPA IPSec tunnel over L3VPN entry 654, and a CPA VLAN tagged L2 interface 656 entry.

As shown in FIG. 6, a particular configuration for a particular access method may be required for a first site associated with a customer (marked as 'F' in FIG. 6), may be required for each site (marked as 'R' in FIG. 6), or may be optional (marked as 'O' in FIG. 6). For example, an L2D may be required for a first site for any of the access methods included in FIG. 6. An L2D may be configured for a customer in order to connect access and multiple services together across a common L2 broadcast domain. In one implementation, an L2D may be implemented as abridge domain. In another implementation, an L2D may be implemented using another technique.

Configuration of Virtual Routing and Forwarding (VRF) may be required for public LP access methods e.g., access methods that use provider network 130). VRF may be used to maintain L3 separation between customers in provider network 130 and in service aggregator 210. Configuration of a virtual router (VR) may be required for private IP access methods (e.g., access methods that use private network 160). A VR may be used to preserve L3 separation between customers at the edge of the network (e.g., at interfaces connecting service aggregator 210 to private network 160).

Configuration of access routing may be required for particular access methods to enable establishment of art external Border Gateway Protocol (eBGP) between service aggregator 210 and a remote peer (e.g., PE router 140) to exchange routing information. The eBGP session may be used to learn routes specific to a customer and to pass a default route to the remote peer.

Configuration of a customer services L3 interface may be required for particular access methods. A customer services L3 interface may enable access to multiple L3 services via an Integrated Routing and Bridging (IRB) interface associated with a particular L2D. An IRB interface may enable switching L2 traffic between devices across an L2D, while routing L3 traffic to non-local destinations. Configuration of an L2 service interface may be required for any access method for each new service requested by the customer. Configuration of service routing may be optional for particular access methods. Service routing may enable management of service advertisements about reachability of particular service devices 115 associated with a service within a particular cloud center services system 110 or across different cloud center services system 110. Service routing may include, for example, the exchange of routing information (e.g., via a. BOP session between service aggregator 210 and service device 115) and the exchange of L2 reachability information (e.g., MAC address learning).

Public IP MPLS transport entry 610 may include information about configurations of service aggregator 210 associated with a public IP MPLS transport access method. A public IP MPLS transport method may use MPLS labels over a public IP network, such as provider network 130, to create an MPLS tunnel between two routers (e.g., connection 145 between PE router 140 and service aggregator 210). As shown in FIG. 6, configuring service aggregator 210 for a public IP MPLS transport access method for a customer may require configuration of an L2D and VRF for a first site, configuration of a customer services L3 interface for the first site, and configuration of an L2 services interface for each service.

Public IP GRE tunnel entry 612 may include information about configurations of service aggregator 210 associated with a public IP GRE tunnel access method. A public IP GRE tunnel transport method ma create a GRE tunnel between two routers (e.g., connection 145 between PE router 140 and service aggregator 210). As shown in FIG. 6, configuring service aggregator 210 for a public IP GRE tunnel access method for a customer may require configuration of an L2D and a VRF for a first site, configuration of a GRE tunnel for each access interface, associated with the customer, that is to use a public IP GRE tunnel, configuration of access routing, configuration of a customer services L3 interface for the first site, and configuration of an L2 services interface for each service.

Public IP IPSec tunnel entry 614 may include information about configurations of service aggregator 210 associated with a public IP IPSec tunnel access method. A public IP IPSec tunnel transport method may create an IPSec tunnel between two routers (e.g., connection 145 between PE router 140 and service aggregator 210). As shown in FIG. 6, configuring service aggregator 210 for a public IP IPSec tunnel access method for a customer may require configuration of an L2D and a VRF for a first site, configuration of an IPSec tunnel for each access interface, associated with the customer, that is to use a public IP IPSec tunnel, configuration of access routing, configuration of a customer services L3 interface for the first site, and configuration of an L2 services interface for each service.

Public IP IPSec tunnel over L3VPN entry 616 may include information about configurations of service aggregator 210 associated with a public IP IPSec tunnel over L3VPN access method. A public IP IPSec tunnel over L3VPN transport method may include an L3VPN network (e.g., wherein particular routes within the L3VPN network are identified using MPLS labels) that is routed across a public IP network using IPSec tunnels (e.g., an IPSec tunnel from a a first PE router 140, associated with a first site, to a second PE router 140, associated with a second site; or an IPSec tunnel from PE router 140 to service aggregator 210). As shown in FIG. 6, configuring service aggregator 210 for a public IP IPSec tunnel over L3VPN access method for a customer may require configuration of an L2D and a VRF for a first site, configuration of an IPSec tunnel over L3VPN for each access interface, associated with the customer, that is to use a public IP IPSec tunnel over L3VPN, configuration of access routing, configuration of a customer services L3 interface for the first site, and configuration of an L2 services interface for each service.

Private IP VLAN L3 interface entry 620 may include information about configurations of service aggregator 210 associated with a private IP VLAN L3 interface access method. A private IP VLAN L3 interface access method may include a VLAN-tagged interface on a private IP network (e.g., private network 160). The interface may be tagged with a single VLAN tag or with multiple VLAN tags. As shown in FIG. 6, configuring service aggregator 210 for a private IP VLAN L3 interface for a customer may require configuration of an L2D and a VR for a first site, configuration of a VLAN tagged L3 interface for each access interface, configuration of access routing, configuration of a customer services L3 interface for the first site, and configuration of an L2 services interface for each service.

Private IP GRE tunnel over L3VPN entry 622 may include information about configurations of service aggregator 210 associated with a private IP GRE tunnel over L3VPN access method. A private IP GRE tunnel over L3VPN transport method may include an L3VPN network that is routed across a private IP network using GRE tunnels. As shown in FIG. 6, configuring service aggregator 210 for a private IP GRE tunnel over L3VPN access method for a customer may require configuration of an L2D and a VR for a first site, configuration of a GRE tunnel over L3VPN for each access interface, associated with the customer, that is to use a GRE tunnel over L3VPN, configuration of configuration of a VLAN tagged interface for each access interface, configuration of access routing, configuration of a customer services L3 interface for the first site, and configuration of an L2 services interface for each service.

Private IP IPSec tunnel over L3VPN entry 624 may include information about configurations of service aggregator 210 associated with a private IP IPSec tunnel over L3VPN access method. A private IP IPSec tunnel over L3VPN transport method may include an L3VPN network that is routed across a private IP network using IPSec tunnels. As shown in FIG. 6, configuring service aggregator 210 for a private IP IPSec tunnel over L3VPN access method for a customer may require configuration of an L2D and a VR for a first site, configuration of an IPSec tunnel over L3VPN for each access interface, associated with the customer, that is to use an IPSec tunnel over L3VPN, configuration of a VLAN tagged L3 interface for each access interface, configuration of access routing, configuration of a customer services L3 interface for the first site, and configuration of an L2 services interface for each service.

Secure gateway VLAN L3 interface entry 630 may include information about configurations of service aggregator 210 associated with a secure gateway VLAN L3 access method. A secure gateway VLAN L3 interface access method may include connecting a customer's private IP network or L2 network (e.g., Ethernet network, Asynchronous Transfer Mode (ATM) network, Frame Relay network, etc) via an IPSec VPN to a Secure Gateway Universal Port on provider network 130. As shown in FIG. 6, configuring service aggregator 210 for a secure gateway VLAN L3 access method for a customer may require configuration of an L2D and a VR for a first site, configuration of a VLAN tagged L3 interface for the first site, configuration of access routing for the first site, configuration of a customer services L3 interface for the first site, and configuration of an L2 services interface for each service.

VLAN tagged L2 interface entry 640 may include information about configurations of service aggregator 210 associated with a VLAN tagged L2 interface access method. A VLAN tagged L2 interface access method may include VLAN tagged L2 interface associated with private L2 network 170. The interface may be tagged with a single VLAN tag or with multiple VLAN tags. As shown in configuring service aggregator 210 for a VLAN tagged L2 interface access method may require configuration of an L2D for a first site, configuration of a VLAN tagged L2 interface for each access interface, and configuration of an L2 services interface for each service.

A Converged Packet Access (CPA) solution may converge services for a customer onto a common access network. In a CPA solution, a customer is provided with a single Ethernet connection for all of the customer's services. For example, private L2 network 170 may be connected to cloud center infrastructure system 120 via one or more Ethernet interfaces. Once a CPA connection is established between a customer's site and provider network 130, the customer's services may be provisioned at Layer 2 regardless of how the service is delivered to the customer's site. A CPA solution may be implemented, for example, using an L3 VLAN, using GRE tunnels over L3VPN, using IPSec tunnels over L3VPN, or using VLAN tagged L2 interfaces. A CPA solution may differ from a VLAN tagged L2 interface in the fact that the CPA solution may entail other configurations and/or services as part of the connection that may be specific to the provider. For example, the provider may guarantee particular traffic rates via the CPA solution and/or may offer a particular security service in connection with the CPA solution.

Converged Packet Access (CPA) VLAN tagged L3 interface entry 650 may include information about configurations of service aggregator 210 associated with a CPA VLAN tagged L3 interface access method. The interface may be tagged with a single VLAN tag or with multiple VLAN tags. A CPA VLAN tagged L3 interface access method may include providing a CPA service over a VLAN tagged L3 interface. As shown in FIG. 6, configuring service aggregator 210 for a CPA service over a VLAN tagged L3 interface access method may require configuration of an L2D for a first site, configuration of a VR for the first site, configuration of a customer services L3 interface for the first site, and configuration of an L2 services interface for each service.

CPA GRE tunnel over L3VPN entry 652 may include information about configurations of service aggregator 210 associated with a CPA GRE tunnel over L3VPN access method. A CPA GRE tunnel over L3VPN access method may include providing a CPA service via a GRE tunnel over L3VPN. As shown in FIG. 6, configuring service aggregator 210 for a CPA GRE tunnel over L3VPN access method may require configuration of an L2D for a first site, configuration of a VR for the first site, configuration of a GRE tunnel over L3VPN for each access interface, configuration of a customer services L3 interface for the first site, and configuration of an L2 services interface for each service.

CPA IPSec tunnel over L3VPN entry 654 may include information about configurations of service aggregator 210 associated with a CPA IPSec tunnel over L3VPN access method. A CPA IPSec tunnel over L3VPN access method may include providing a CPA service via an IPSec tunnel over L3VPN. As shown in FIG. 6, configuring service aggregator 210 for a CPA IPSec tunnel over L3VPN access method may require configuration of an L2D for a first site, configuration of VR for the first site, configuration of an IPSec tunnel over L3VPN for each access interface, configuration of a customer services L3 interface for the first site, and configuration of an services interface for each service.

CPA VLAN tagged L2 interface 656 entry may include information about configurations of service aggregator 210 associated with a CPA VLAN tagged L2 interface access method. A CPA VLAN tagged L2 interface access method may include providing a CPA service via a VLAN tagged L2 interface. The interface may be tagged with a single VLAN tag or with multiple VLAN tags. As shown in FIG. 6, configuring service aggregator 210 for a CPA VLAN tagged L2 interface access method may require configuration of an L2D for a first site, configuration of a VLAN tagged L2 interface for each access interface, and configuration of an L2 services interface for each service.

Although FIG. 6 shows exemplary functional components of configuration table 550, in other implementations, configuration table 550 may include fewer entries, different entries, differently arranged entries, or additional entries than depicted in FIG. 6.

Figure 7:
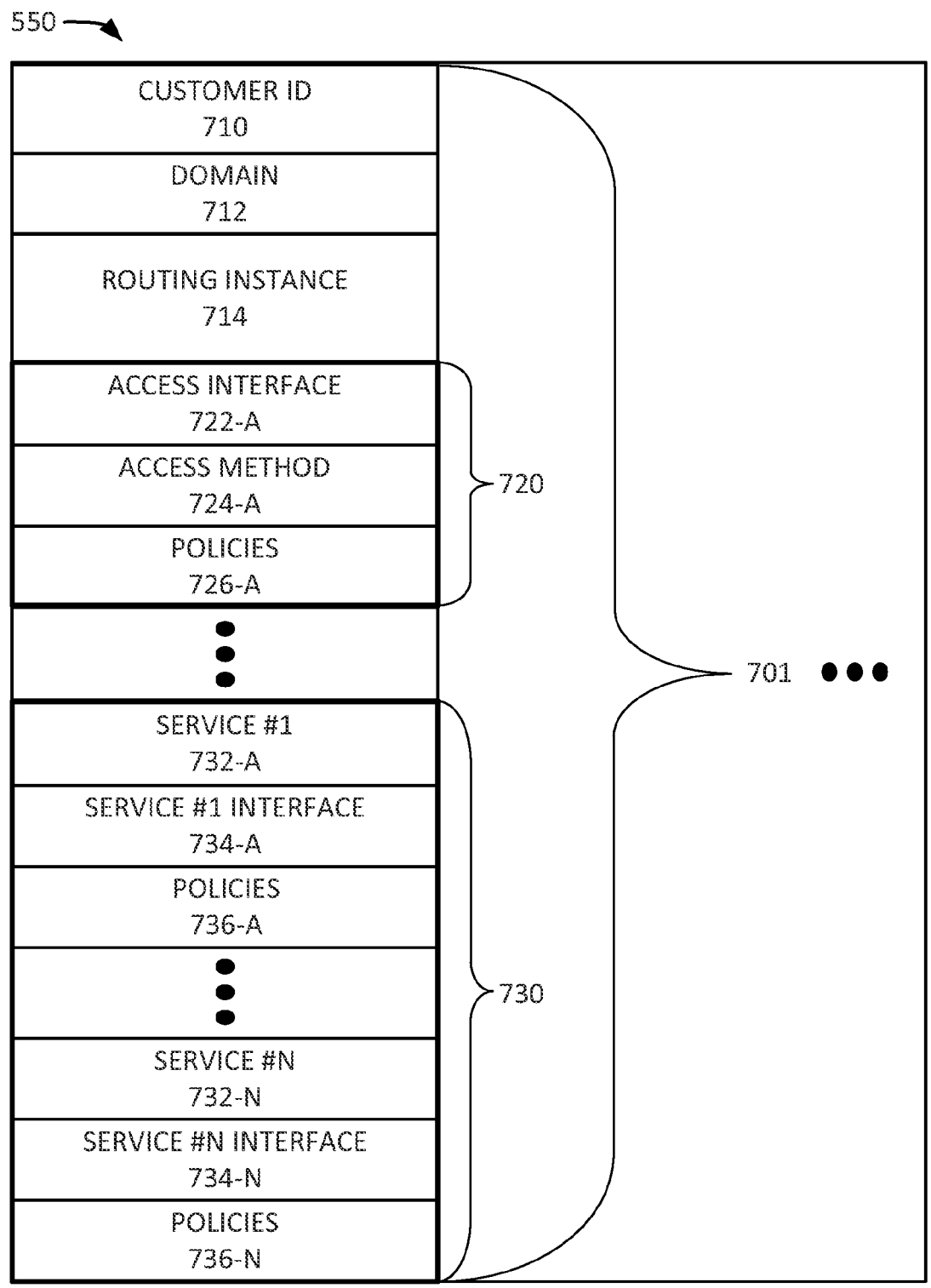
FIG. 7 is a diagram of exemplary components that may be stored in the configuration memory of FIG. 5.

FIG. 7 is a diagram illustrating exemplary components that may be stored in configuration memory 550. As shown in FIG. 7, configuration memory 550 may include one or more customer records 701 (referred to herein collectively as "customer records 701" and individually as "customer record 701"). Customer record 701 may include a customer identifier (ID) field 710, a domain field 712, a routing instance field 714, one or more access method fields 720, and one or more service fields 730.

Customer field 710 may include an identifier that uniquely identifies a particular customer. Domain field 712 may include information identifying an L2 domain associated with the customer. For example, domain field 712 may identify interfaces that are part of the customer's L2 domain. Routing instance field 714 may identify a routing instance associated with the customer. For example, routing instance field 714 may include a routing table and one or more forwarding tables associated with the customer.

Each access method field 720 may store information about a particular access method associated with the customer. Each access method field 720 may include an access interface field 722, an access method field 724, and a policies field 726. Access interface field 722 may identify a particular access interface associated with the customer. An access interface may correspond to an interface of service aggregator 210 that communicates with a device associated with the customer (e.g., PE router 140 or customer device 165). Access method field 724 may identify a particular access method associated with the particular access interface.

Policies field 726 may store one or more policies associated with the particular access interface that may be used for policy-based routing or forwarding. For example, policies field 726 may identify a particular guaranteed Quality of Service (QoS) associated with the particular access interface and/or may enforce a data rate limit associated with the particular access interface. As another example, policies field 726 may identify a particular service level associated with the access interface (e.g., 'gold' level, 'silver' level, 'bronze' level) that is associated with a particular QoS and/or data rate limit.

As yet another example, policies field 726 may include a match condition and an action associated with the match condition. For example, the match condition may correspond to any IP address associated with customer network 155 and the action may correspond to an instruction to forward a data unit to a first access interface associated with the customer. Thus, any data unit received from customer network 155 may be forwarded to the first service interface associated with the customer.

Service fields 730 may define particular sequence of services associated with the customer. Each service field 730 may identify a particular service purchased by the customer. Each service field 730 may include a service field 732, a service interface 734, and a policies field 736. Service field 732 may identify a particular service associated with the customer. Service access interface 734 may identify a particular L2 interface associated with the service. For example, if the customer purchases a firewall service, service interface 734-A may identify an L2 interface associated with a firewall device in cloud center services system 110.

Policies field 736 may store one or more policies associated with the particular service interface that may be used for policy-based routing or forwarding. The policy-based routing may be used for service stitching to stitch together services purchased by the customer. For example, policies field 736 may include a match condition and an action associated with the match condition. For example, the match condition may correspond to a data unit associated with the L2D associated with the customer and the action may correspond to forwarding the data unit to the next service interface in a sequence of traffic processing services. Thus, if the customer purchased a DDOS service and a firewall service, service #1 interface may include a policy that sends data units, associated with the customer's L2D, to service #2 interface, which may be associated with a firewall service device 115.

Furthermore, policies field 736 may identify a particular guaranteed QoS associated with the service and/or may enforce a data rate limit associated with the service. As another example, policies field 736 may identify a particular service level associated with the service (e.g., 'gold' level, 'silver' level, 'bronze' level) that is associated with a particular QoS and/or data rate limit.

While policies field 726 and policies field 736 describe policies for an access interface or a service interface, configuration memory 550 may also include a policy associated with an interface that may bypass a customer-specific policy and may be applied to traffic for all customers.

Although FIG. 7 shows exemplary components of configuration memory 550, in other implementations, configuration memory 550 may include fewer components, different components, differently arranged components, or additional components than depicted in FIG. 7.

Figure 8:
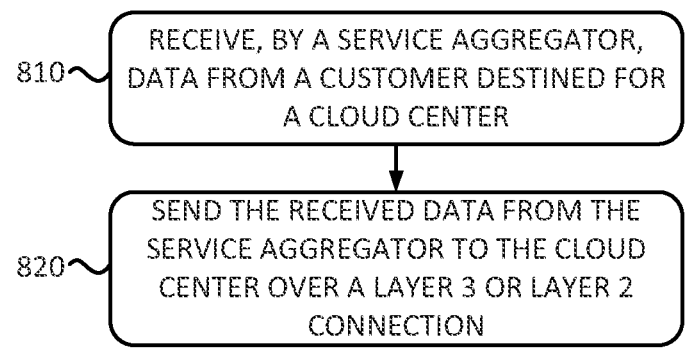
FIG. 8 is a flow chart of an exemplary process for enabling a customer to access a cloud center system using a service aggregator according to an implementation described herein.

FIG. 8 is a flow chart of an exemplary process for enabling a customer to access a cloud center system using a service aggregator according to an implementation described herein. In one implementation, the process of FIG. 8 may be performed by service aggregator 210. In other implementations, some or all of the process of FIG. 8 may be performed by another device or a group of devices separate from service aggregator 210 and/or including service aggregator 210.

The process of FIG. 8 may include receiving, by a service aggregator, data, from a customer, destined for a cloud center (block 810). For example, customer device 155 may send data to a destination device located at a remote site across provider network 130. PE router 150, located on provider network 130, may be configured to send the data to service aggregator 210 over connection 145 (e.g., an MPLS tunnel). Service aggregator 210 may receive the data from PE router 140, without the data having to be routed through another PE router 140 on the provider network 130, since service aggregator 210 may be part of provider network 130.

As another example, customer device 165 may send data across private IP network 160 to another destination device in private IP network 160. The default gateway associated with customer device 165 in private IP network 160 may be configured to send the data to cloud center infrastructure system 120. Service aggregator 210 may receive the data from the default gateway. As yet another example, customer device 175 may send data across private L2 network 170 to another destination in private L2 network 170. A switch in private 112 network 170 may use policy-based forwarding to forward the data to cloud center infrastructure system 120. Service aggregator 210 may receive the data from the switch via an Ethernet connection.

The data received from the service aggregator may be sent to the cloud center over a Layer 3 or a Layer 2 connection (block 820). For example, service aggregator 210 may send the data to service device 115, located in cloud center services system 110 and associated with a service purchased by the customer, over an L2 connection. For example, the customer may have purchased a firewall service and the device located in cloud center services system 110 may perform a firewall service for data associated with the customer. As another example, service aggregator may send the data to a service device 115, located in another cloud center services system 110 (e.g., in a situation in which a particular service device 115 closest to service aggregator 210 has failed), across provider network 130.

Figure 9:
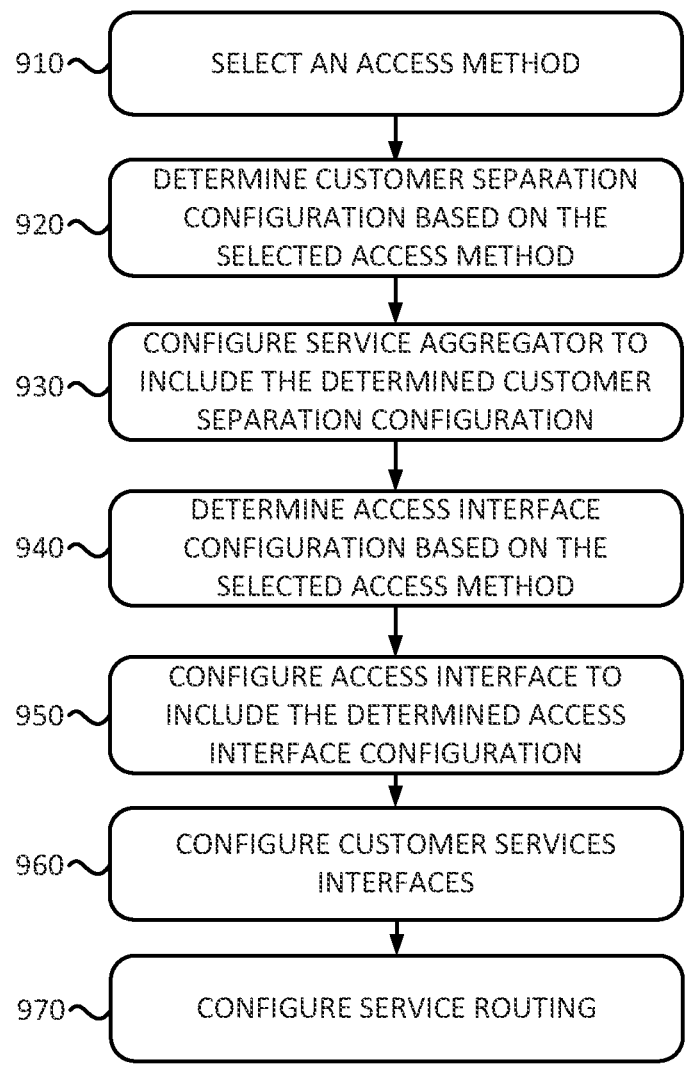
FIG. 9 is a flow chart of an exemplary process for configuring a service aggregator for one or more access methods according to an implementation described herein.

FIG. 9 is a flow chart of an exemplary process for configuring a service aggregator for one or more access methods according to an implementation described herein. In one implementation, the process of FIG. 9 may be performed by service aggregator 210. In other implementations, some or all of the process of FIG. 9 may be performed by another device or a group of devices separate from service aggregator 210 and/or including service aggregator 210.

The process of FIG. 9 may include selecting an access method (block 910). For example, a customer may select a particular access method. For instance, the customer may have multiple remote sites connected across provider network 130 using MPLS tunnels. The customer may select to access cloud center services system 110 using MPLS transport.

A customer separation configuration may be determined based on the selected access method (block 920). For example, customer separation module 510 may access configuration table 540 to determine one or more customer separation configurations associated with the selected access method. A customer separation configuration may include an L2D configuration, a VRF configuration, and/or a VR configuration. As an example, a public IP MPLS transport method may require configuration of an L2D for a first site associated with the customer and configuration of virtual routing and forwarding for the first site. As another example, a VLAN tagged L2 interface access method may only require configuration of an L2D for the first site associated with the customer.

The service aggregator may be configured to include the determined customer separation configuration (block 930). For example, customer separation module 510 may generate a routing instance that includes bridge domain associated with the customer. Additionally, customer separation module 510 may generate either a VRF or a VR for the routing instance.

An access interface configuration may be determined based on the selected access method (block 940). For example, access interface configuration module 520 may access configuration table 540 to determine one or more customer separation configurations associated with the selected access method. Additionally, access interface configuration module 520 may determine whether access routing needs to be configured for the access interface. For example, if the access method corresponds to a private GRE tunnel over L3VPN, access interface configuration module 520 may determine that the access interface needs to be configured for a GRE tunnel over L3VPN, for a VLAN tagged L3 interface, and that access routing needs to be configured as well.

The access interface may be configured based on the determined access interface configuration (block 950). For example, access interface configuration module 520 may configure the access interface, associated with the customer, to create the determined configurations. Thus, for example, if the access method corresponds to a private IP GRE tunnel over L3VPN, access interface configuration module 520 may define an IP address, associated with private network 160, for the source of the GRE tunnel, and IP address, associated with private network 160, for the destination of the tunnel, may define a VLAN tag, associated with the customer, for the access interface, and may configure the access interface for eBGP. Furthermore, access configuration module 520 may add a policy to the access interface to forward data units, associated with the customer, to a service interface associated with the first service in a sequence of traffic processing services, associated with the customer.

A customer services interface may be configured (block 960). For example, service aggregation module 530 may generate a customer services L3 interface and may generate an L2 service interface for each service purchased by the customer. For example, if the customer purchased an email filter service and a hosted VoIP service, service aggregation module 530 may generate a first L2 interface, associated with a first device in cloud center services system 110 that handles email filtering, and may generate a second L2 interface, associated with a second device in cloud center services system 110 that handles a hosted VoIP service. Furthermore, a service interface may be configured with a policy to forward data units, associated with the customer, to a next interface in a sequence of traffic processing services, associated with the customer.

Services routing may be configured (block 970). For example, service aggregation module 530 may, for a particular service purchased by the customer, identify service devices 115 associated with the particular service. The identified service devices 115 may be located in a same cloud center services system 110 or in different cloud center services system 110. Service aggregation module 530 may determine a priority sequence for the identified service devices 115 and may configure the exchange of reachability information for the identified service devices 115 so that service aggregator module 530 may receive service advertisements associated with the identified service device 115. For example, service aggregator module 530 may enable the establishment of a BGP session between service aggregator 210 and an identified service device 115.

Figure 10:
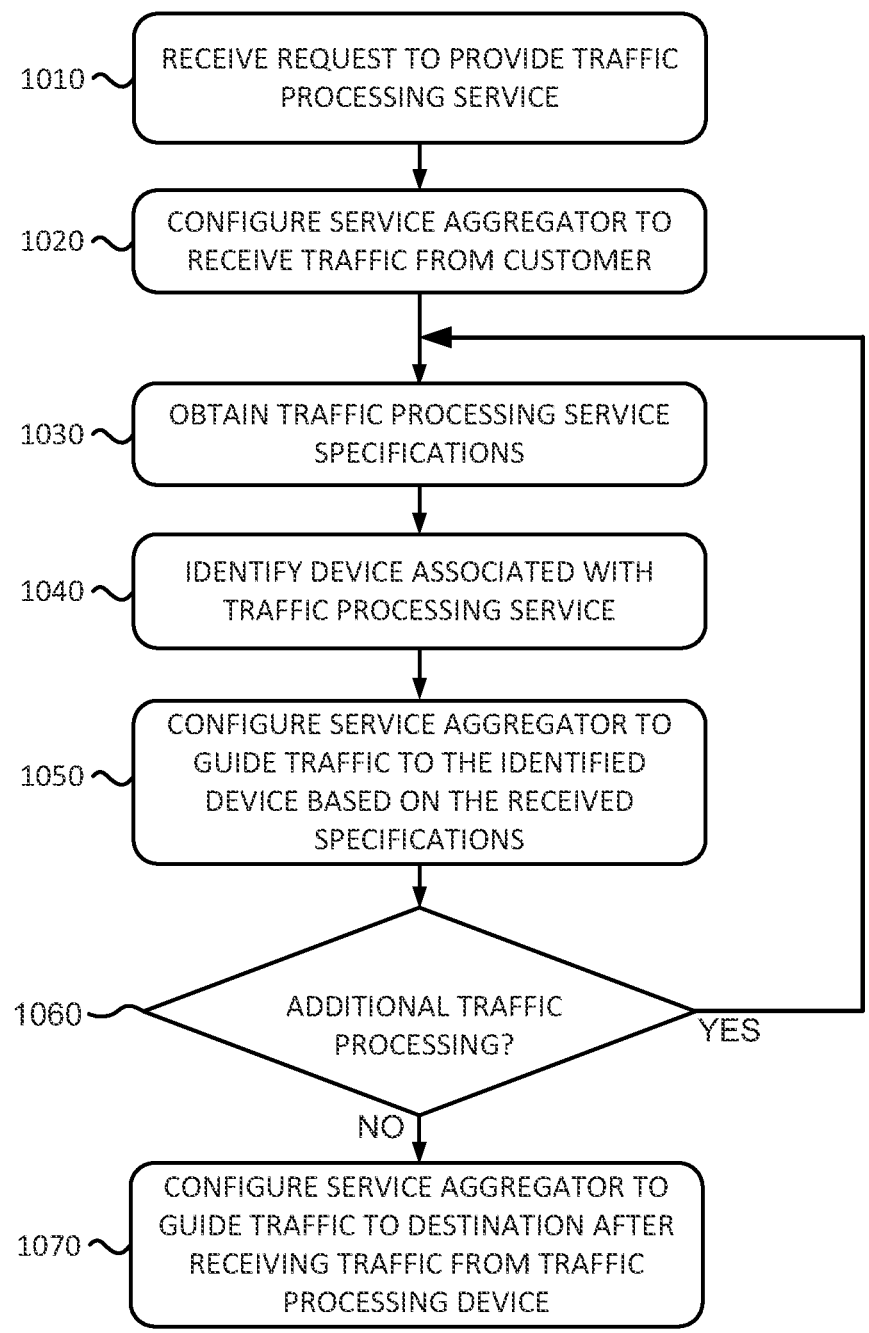
FIG. 10 is a flow chart of an exemplary process for configuring a service aggregator for aggregating services according to an implementation described herein.

FIG. 10 is a flow chart of an exemplary process for configuring a service aggregator for aggregating services according to an implementation described herein. In one implementation, the process of FIG. 10 may be performed by service aggregator 210. In other implementations, some or all of the process of FIG. 10 may be performed by another device or a group of devices separate from service aggregator 210 and/or including service aggregator 210.

The process of FIG. 10 may include receiving a request to provide a traffic processing service (block 1010). For example, a customer may purchase a traffic processing service through an ordering system associated with cloud center services system 110. For example, a customer may purchase a firewall service.

A service aggregator may be configured to receive traffic from a customer (block 1020). For example, service aggregator 210 may be configured for a particular access method (as explained above with reference to FIG. 9). As an example, an MPLS tunnel may be set up between PE router 140 and service aggregator 210.

Traffic processing service specifications may be obtained (block 1030). For example, service aggregator 210 may obtain specifications about a service purchased by the customer by, for example, interacting with the ordering system associated with cloud center services system. The specifications may include parameters associated with the traffic processing service (e.g., a QoS requirement, a data rate limit, etc.), specifications for particular sites, associated with the customer, to which the traffic processing service is to be applied, time periods during which the traffic processing service is to be applied, and/or any other specification that may be associated with the traffic processing service. The specifications may be used, for example, to generate one or more policies to be used in forwarding traffic to the service interface associated with the traffic processing service.

A device associated with the traffic processing service may be identified (block 1040). For example, service aggregation module 530 may access service devices memory 560 to identify a device (and/or an interface of service aggregator 210 associated with the device) that is associated with the traffic processing service.

The service aggregator may be configured to guide traffic to the identified device based on the received specifications (block 1050). For example, service aggregation module 530 may generate a L2 service interface for a routing instance associated with the customer, wherein the L2 service interface is associated with identified device. Furthermore, service aggregation module 530 may generate a policy for an access interface (if the traffic processing service is a first service in a sequence of traffic processing services associated with the customer) or a policy for a service interface, associated with a preceding traffic processing service in a sequence of traffic processing services associated with the customer (if the traffic processing service is not the first service).

A determination may be made as to whether additional traffic processing services are requested (block 1060). For example, service aggregator 210 may determine whether the customer has purchased any additional traffic processing services by, for example, interacting with an ordering system associated with cloud center services system 110. If it is determined that additional traffic processing services are requested (block 1060—YES), processing may return to block 1030 to obtain service specifications for another traffic processing service.

If it is determined that no additional traffic processing services are requested (block 1060—NO), the service aggregator may be configured to guide traffic to a destination after receiving the traffic from the traffic processing device (block 1070). For example, service aggregator 210 may configure the routing instance, associated with the customer, with a routing table that includes routes to the customer's sites. Furthermore, service aggregation module 530 may generate a policy for the service interface, associated with the last traffic processing service, to send traffic toward a routing process (i.e., to look up a next hop destination for the traffic based on the destination address associated with the traffic).

Figure 11:
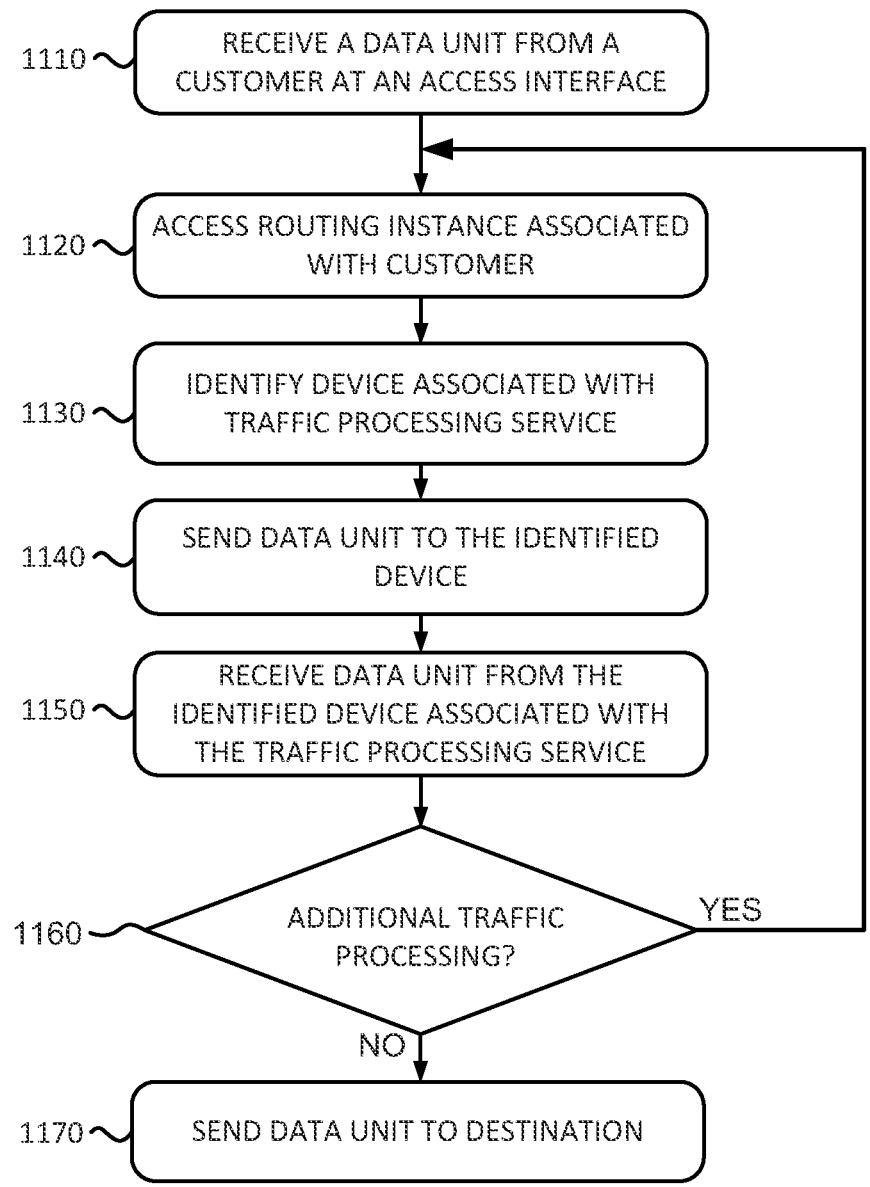
FIG. 11 is a flow chart of an exemplary process for processing traffic according to an implementation described herein.

FIG. 11 is a flow chart of an exemplary process for processing traffic according to an implementation described herein. In one implementation, the process of FIG. 11 may be performed by service aggregator 210. In other implementations, some or all of the process of FIG. 11 may be performed by another device or a group of devices separate from service aggregator 210 and/or including service aggregator 210.

The process of FIG. 11 may include receiving a data unit from a customer at an access interface (block 1110). For example, service aggregator 210 may receive a data unit from a device associated with a customer (e.g., from PE router 140 or from customer device 165). A routing instance associated with the customer may be accessed (block 1120) and a device associated with a traffic processing service may be identified (block 1130). For example, service aggregator 210 may access the routing instance, associated with the customer, to determine a first L2 service interface associated with the customer. Alternatively, service aggregator 210 may identify an L2D associated with the data unit and may identify a policy associated with the access interface. The policy may include an action to send the data unit to the device associated with the first traffic processing service in a sequence of traffic processing services associated with the customer.

The data unit may be sent to the identified device (block 1140). For example, service aggregator 210 may send the data unit to a device associated first L2 service interface. The data unit may be received from the identified device associated with the traffic processing service (block 1150). For example, the device associated with the first L2 service interface may process the data unit and determine that the data unit should be forwarded to the next traffic processing service based on a policy associated with the L2 service interface (or may send the data unit to its destination, if no other traffic processing services are associated with the customer).

A determination may be made as to whether additional traffic processing is to be performed (block 1160). For example, service aggregator 210 may access the routing instance to determine whether there is another L2 service interface associated with the customer. If it is determined that additional traffic processing is to be performed (block 1160—YES), processing may return to block 1120 to determine to send the data unit to another device associated with a traffic processing service.

If it is determined that no additional traffic processing is to be performed (block 1160—NO), the data unit may be sent to destination (block 1170). As an example, if the customer is associated with three different sites connected with MPLS tunnels, the routing instance may include a routing table that associates each site with a particular MPLS label and associates known destination addresses for the site with the particular MPLS label. Service aggregator 210 may identify a destination address of a data unit (assuming the data unit has been forwarded by all the traffic processing services), may identify an MPLS label associated with the destination address, may encapsulate the data unit using the identified MPLS label, and may forward the data unit via an interface associated with the identified MPLS label. Alternately, if the destination address is not found in the routing instance, the data unit may be broadcasted to all the sites associated with the customer.

Figure 12:
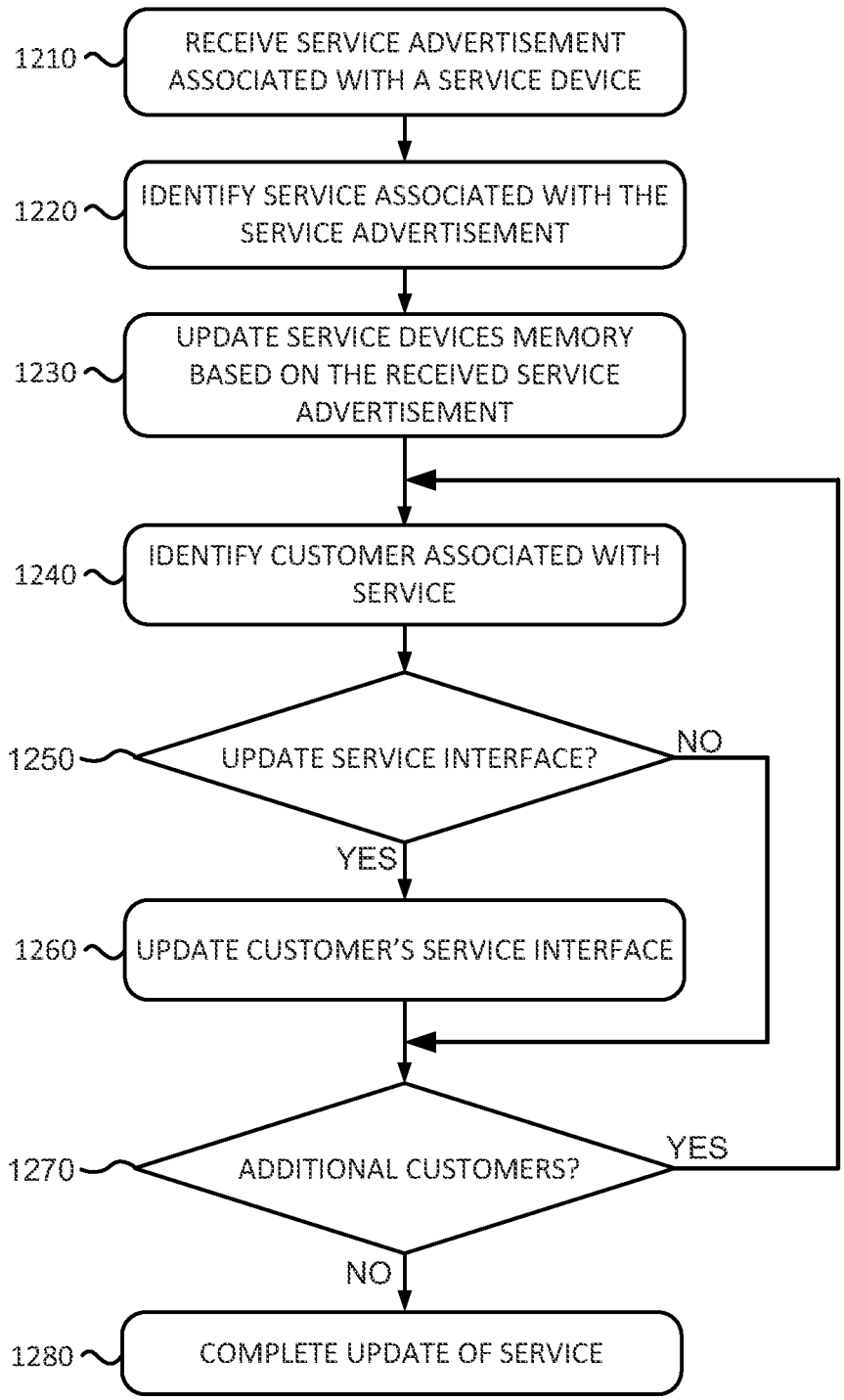
FIG. 12 is a flow chart of an exemplary process for service routing according to an implementation described herein.

FIG. 12 is a flow chart of an exemplary process for service routing according to an implementation described herein, in one implementation, the process of FIG. 12 may be performed by service aggregator 210. In other implementation, some or all of the process of FIG. 12 may be performed by another device or a group of devices separate from service aggregator 210 and/or including service aggregator 210.

The process of FIG. 12 may include receiving a service advertisement associated with a service device (block 1210). For example, service aggregator module 530 may receive a service advertisement from service device 115, from an L3 or L2 device associated with service device 115 (e.g., a default gateway or switch connected to service device 115), or from another service aggregator 210 (e.g., associated with another cloud center services system 110). In one example, the service advertisement may include reachability information associated with service device 115, such as information indicating service device 115 is unreachable (e.g., as a result of a failed connection or as a result of failure of service device 115), information advertising a new path to service device 115, information indicating that service device 115 is now reachable (e.g., a new service device 115 came online), and/or another type of reachability information.

In another example, the service advertisement may include traffic engineering information and/or load balancing information, such as, for example, information indicating that traffic associated with service device 115 or with a connection to service device 115 has exceeded a particular threshold, that computing resources associated with service device 115 have exceeded a particular threshold, and/or another type of traffic engineering or load balancing information.

In yet another example, the service advertisement may include an instruction to set up service to service traffic between two service devices 115. For example, a first service device 115 may perform data storage functions for a customer and a second service device 115, located in a different cloud center services system 110, may functions as a storage backup device. The service advertisement may establish a data exchange between the first service device 115 and the second service device 115.

The service associated with the service advertisement may be identified (block 1220) and a service devices memory may be updated based on the received service advertisement (block 1230). For example, service aggregation module 530 may identify the service associated with the service advertisement by identified service device 115 associated with the advertisement and accessing service devices memory 560 to identify the particular service associated with the identified service device 115. Service devices memory 560 may be updated using the information included in the received service advertisement. For example, if the service advertisement includes an indication that the identified service device 115 has failed, service devices memory 560 may be updated to indicate that the identified service device 115 should not be used and that traffic should be re-routed to a different service device 115 associated with the service.

A customer associated with the service may be identified (block 1240). For example, service aggregation module 530 may identify a customer that has purchased the service associated with service device 115 associated with the service advertisement (e.g., by accessing configuration memory 550 to check customer records 701). A determination may be made as to whether a service interface, associated with the customer, should be updated (block 1250). For example, service aggregation module 530 may determine whether traffic should be sent to a different service device 115 for the customer.

The determination as to whether traffic should be send to a different service device 115 for a customer may be based on a level of service purchased by the customer, on a geographic location associated with the customer, on a type of access method associated with the customer, and or based on another type of criterion, which may be stored in service devices memory 560.

For example, assume a first customer's private IP network 160 is located in California and the first customer has purchased a firewall service, and that a second customer's private IP network 160 is located in New York and the second customer has also purchased a firewall service. Now assume that both the first customer's and the second customer's traffic is being routed through a cloud center services system 110, located in Virginia, which includes a firewall service device 115. If a new firewall service device 115 comes online in a cloud center services system 110 in California, the first customer's traffic may be re-routed to the new firewall service device 115 in the cloud center services system 110 located in California, as this may be more efficient for geographic reasons. The second customer's traffic may continue to be routed to the cloud center services system 110 in Virginia.

If it is determined that the customer's service interface is to be updated (block 1250—YES), the customer's service interface may be updated. For example, assume service device 115, associated with a second service purchased by a customer, has failed. Thus, traffic may need to be sent to a backup service device 115 associated with the second service. If the customer has purchased a first service and a second service, and the first service and the second service are stitched together in sequence, a first service interface, associated with the first service, may be updated to forward traffic received via the first service interface to a service interface associated with the backup service device 115. If it is determined that the customer's service interface is not to be updated (block 1250—NO), processing may continue to block 1270.

A determination may be made as to whether there are additional customers associated with the service (block 1270). If it is determined that there are additional customers associated with the service (block 1270—YES), processing may return to block 1240. If it is determined that there are no additional customers associated with the service (block 1270 NO), updating of the service may be completed (block 1280). For example, service aggregator 210 may send an acknowledgement response to the service advertisement and/or may forward the service advertisement to another service aggregator 210.

Figure 13:
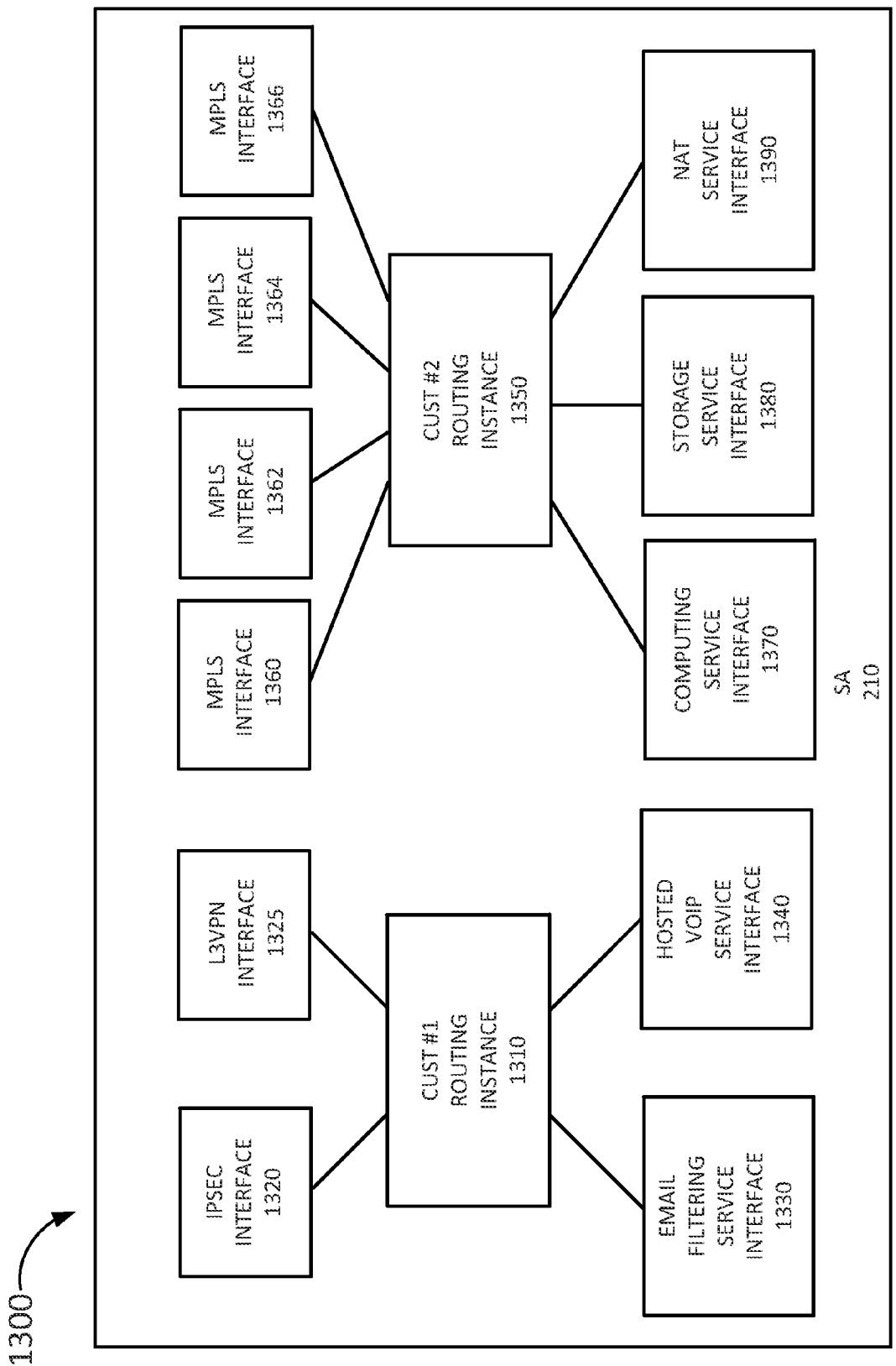
FIG. 13 is a diagram of a first example that illustrates aspects of an implementation described herein.

FIG. 13 is a diagram of a first example 1300 that illustrates aspects of an implementation described herein. Example 1300 illustrates service aggregator 210 configured for two different customers. Example 1300 may include a first routing instance 1310, associated with a first customer, and a second routing instance 1350, associated with a second customer. The first customer may have purchased an email filtering service and a hosted VoIP service. Furthermore, the first customer may have a site that connects to service aggregator 210 using a public IP IPSec access method and may have set up an L3VPN network that provides remote access to employees. Thus, first routing instance 1310 may include an IPSec access interface 1320, which may exchange traffic with the customer's site, and an L3VPN access interface 1325, which may exchange traffic with remote devices associated with employees of the customer. Furthermore, first routing instance 1310 may include a first L2 service interface (email filtering service interface 1330) and a second L2 service interface (hosted VOW service interface 1340). Thus, data units associated with an email service may be forwarded via email filtering service interface 1330 and data units associated with a VoIP telephone call may be forwarded via hosted VoIP service interface 1340.

Second routing instance 1350 may be associated with a customer that has 4 sites that are connected with MPLS tunnels. Thus, second routing instance 1350 may include a first MPLS interface 1360, associated with a first site, a second MPLS interface 1362, associated with a second site, a third MPLS interface 1364, associated with a third site, and a fourth MPLS interface 1366, associated with a fourth site. Furthermore, the second customer may have purchased computing as a service, may have purchased a storage service, and may have purchased a network address translation service. Thus, second routing instance 1350 may include a computing service interface 1370, a storage service interface 1380, and a NAT service interface 1390.

In another implementation, the second customer may need to maintain traffic separation between one or more of the sites. In such a situation, separate Layer 2 domains and/or routing instances may be generated for one or more of the sites. For example, first MPLS interface 1360 may be associated with a first routing instanced second MPLS interface 1362 may be associated with a second routing instance. Each of the routing instance may be associated with a different service interface for a particular purchased service.

Figure 14:
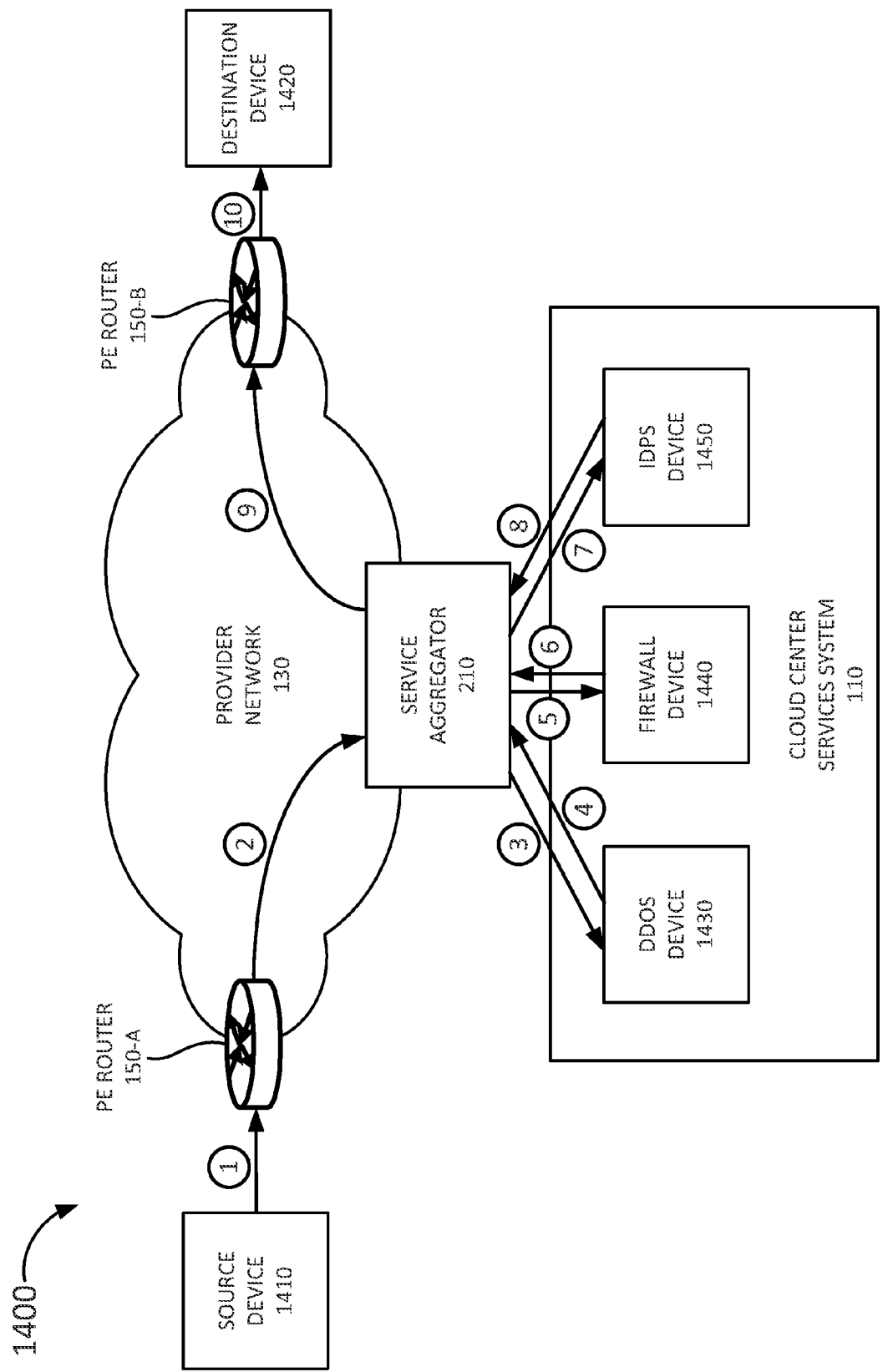
FIG. 14 is a diagram of a second example that illustrates aspects of an implementation described herein.

FIG. 14 is a diagram of a second example 1400 that illustrates aspects of an implementation described herein. Example 1400 illustrates how data units may be processed if a customer purchases a DDOS service, a firewall service, and an IDPS service. Assume the customer is sending traffic from a source device 1410, located in a first site, to a destination device 1420, located in a second site. Source device 1410 may send traffic to PE router 150-A, which enables the first site to connect to provider network 130 (item (1) in FIG. 14). PE router 150-A may be configured to route traffic from the first site to service aggregator 210 (item (2) in FIG. 4). For example, an MPLS tunnel may be set up between PE router 150-A and an access interface of service aggregator 210 associated with the first site.

Service aggregator 210 may receive traffic via the MPLS tunnel at an MPLS access interface. A policy associated with the MPLS access interface may forward the traffic to DDOS device 1430 (item (3) in FIG. 14). DDOS device 1430 may perform DDOS detection and DDOS mitigation services. For example, DDOS device 1430 may analyze the traffic to determine whether the traffic is part of a. DDOS attack. If DDOS device 1430 determines a packet is associated with a. MOS attack, DDOS device 1430 may drop the packet, ensuring that traffic associated with a DDOS attack does no reach destination device 1420. Traffic that has not been blocked by DDOS device 1430 may be returned to service aggregator 210 (item (4) in FIG. 14).

Service aggregator 210 may determine that traffic received from DDOS device 1430 is to be switched to firewall device 1440 based on a policy associated with the DDOS device service interface. The policy may forward data units, associated with the customer's L2D, to firewall device 1440. Service aggregator 210 may send the traffic to firewall device 1440 (item (5) in FIG. 14). Firewall device 1440 may perform a firewall service for the customer. For example, firewall device 1440 may apply one or more filters to the traffic. Assume the customer sets up a filter that allows only source device 1410 from the first site to send packets to the second site, which includes destination device 1420. Thus, packets sent from any other device from the first site may be dropped by firewall device 1440. Traffic that has been allowed by firewall device 1440 may be returned to service aggregator 210 (item (6) in FIG. 14).

Service aggregator 210 may determine that traffic received from firewall device 1440 is to be switched to IDPS device 1450 based on a policy associated with the firewall device service interface. Service aggregator 210 may send the traffic to IDPS device 1450 (item (7) in FIG. 14). IDPS device 1450 may perform an intrusion detection and prevention service for the customer. For example, IDPS device 1450 may compare data patterns in the traffic with data patterns associated with previously catalogued intrusion attacks. Thus, packets associated with data patterns that correspond to known intrusion attacks may be blocked by IDPS device 1450. Traffic that has been allowed by IDPS device 1450 may be returned to service aggregator 210 (item (8) in FIG. 14).

Service aggregator 210 may determine that traffic received from IDPS device 1450 may be forwarded to destination associated with the traffic based on a policy associated with the IDPS device service interface. For example, service aggregator 210 may look up a destination address in data units destined for destination device 1420 and may determine that destination device 1420 is reachable through PE router 150-B. Consequently, service aggregator 210 may forward the traffic to PE router 150-B (item (9) in FIG. 14). PE-router 150-B may forward the received traffic to destination device 1420 (item (10) in FIG. 14).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 8-12, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A cloud center infrastructure system comprising:
    a service aggregator functioning as an edge router of a provider network and configured to:
        store information identifying a sequence of traffic processing services that are to be applied to data units associated with a customer;
        receive, via the provider network, a data unit from a customer device, associated with the customer;
        identify a first device, associated with a first traffic processing service, based on the sequence of traffic processing services associated with the customer; and
        send the data unit to the first device, wherein the first device is located in a cloud services center, and wherein the first device is connected to the service aggregator over a Layer 2 connection.

2. The cloud center infrastructure system of claim 1, wherein the service aggregator is further configured to:
    receive the data unit from the first device;
    identify a second device, associated with a second traffic processing service, based on the sequence of traffic processing services associated with the customer; and
    send the data unit to the second device, in response to receiving the data unit from the first device.

3. The cloud center infrastructure system of claim 1, wherein the service aggregator is further configured to:
    determine that the sequence of traffic processing services has been completed for the data unit; and
    send the data unit to a destination device, associated with the data unit, in response to determining that the sequence of traffic processing services has been completed for the data unit.

4. The cloud center infrastructure system of claim 1, wherein the sequence of traffic processing services includes one or more of:
    a distributed denial of service attack mitigation service;
    a distributed denial of service attack detection service;
    a firewall service;
    an intrusion detection and prevention service;
    an email filtering service;
    a web site filtering service;
    a load balancing service;
    a network address translation service;
    a proxy service;
    a virtual private network service; or
    a virtual private local area network service.

5. The cloud center infrastructure system of claim 1, wherein the service aggregator includes a first service aggregator and a second service aggregator, the cloud center infrastructure system further comprising:
    a first firewall device, connected to the first service aggregator and the second service aggregator, configured to protect the cloud services center from unauthorized access; and
    a second firewall device, connected to the first service aggregator and the second service aggregator, configured to protect the cloud services center from unauthorized access.

6. The cloud center infrastructure system of claim 5, further comprising:
    a first network fabric device, connected to the first firewall device and the second firewall device, configured to provide Layer 2 connections to a plurality of devices, wherein each of the plurality of devices is associated with a particular cloud service, and wherein the plurality of devices includes the first device; and
    a second network fabric device, connected to the first firewall device and the second firewall device, configured to provide Layer 2 connections to the plurality of devices.

7. The cloud center infrastructure system of claim 6, further comprising:
    a network storage device, connected to the first network fabric device, configured to store configuration information associated with the first service aggregator, the second service aggregator, the first firewall device, the second firewall device, the first network fabric device, or the second network fabric device; and
    a load balancer device, connected to the second network fabric device, configured to perform load balancing operations for first service aggregator, the second service aggregator, the first firewall device, the second firewall device, the first network fabric device, or the second network fabric device.

8. The cloud center infrastructure system of claim 1, wherein the service aggregator is configured to keep traffic, associated with the customer, separate from traffic associated with another customer.

9. The cloud center infrastructure system of claim 1, wherein the service aggregator is configured to:
    generate a routing instance for the customer, wherein the routing instance determines how traffic, associated with the customer, is to be routed through the service aggregator based on the sequence of traffic processing services.

10. The cloud center infrastructure system of claim 1, wherein the service aggregator is configured to receive the data unit from the customer device via a plurality of different access methods.

11. The cloud center infrastructure system of claim 1, wherein the plurality of different access methods includes one or more of:
    a public multi-protocol label switching (MPLS) transport;
    a public Internet Protocol (IP) Generic Routing Encapsulation (GRE) tunnel;
    a public IP Protocol Security (IPSec) tunnel;
    a public IP IPSec tunnel over a Layer 3 Virtual Private Network (L3VPN);
    a private IP Virtual Local Area Network (VLAN) L3 interface;
    a private IP GRE tunnel over L3VPN;
    a private IP IPSec tunnel over L3VPN;
    a secure gateway VLAN L3 interface;
    a VLAN tagged Layer 2 (L2) interface;
    a Converged Packet Access (CPA) VLAN tagged L2 interface;

a CPA VLAN tagged L3 interface;
a CPA GRE tunnel over L3VPN;
a CPA IPSec tunnel over L3VPN; or
a CPA VLAN tagged L2 interface.

12. The cloud center infrastructure system of claim 11, wherein the service aggregator is further configured to:
   select an access method for the customer;
   determine a customer separation configuration based on the selected access method; and
   configure the service aggregator to include the determined customer separation configuration.

13. The cloud center infrastructure system of claim 12, wherein the service aggregator is further configured to:
   determine an access interface configuration based on the selected access method; and
   configure an access interface, associated with the customer, based on the determined access interface configuration.

14. The cloud center infrastructure system of claim 12, wherein the service aggregator is further configured to:
   configure a customer services interface associated with the customer.

15. The cloud center infrastructure system of claim 12, wherein the service aggregator is further configured to:
   configure service routing between the service aggregator and a Layer 3 device associated with the customer.

16. The cloud center infrastructure system of claim 1, wherein the service aggregator is connected to a private Internet Protocol network, and wherein the service aggregator is further configured to:
   receive, via the private Internet Protocol network, another data unit from another customer device, associated with another customer;
   identify a second device, associated with a second traffic processing service, based on a sequence of traffic processing services associated with the other customer; and
   send the other data unit to second device, wherein the second device is located in the cloud services center.

17. The cloud center infrastructure system of claim 1, wherein the service aggregator is connected to a private Layer 2 network, and wherein the service aggregator is further configured to:
   receive, via the private Layer 2 network, another data unit from another customer device, associated with another customer;
   identify a second device, associated with a second traffic processing service, based on a sequence of traffic processing services associated with the other customer; and
   send the other data unit to second device, wherein the second device is located in the cloud services center.

18. The cloud center infrastructure system of claim 1, wherein the service aggregator is further configured to:
   receive a service advertisement message associated with the first traffic processing service; and
   update a service interface associated with the first device, based on information included in the service advertisement message.

19. A method performed by a networking device, the method comprising:
   receiving, by the networking device, a request to provide a first traffic processing service for a first customer, wherein the networking device is located on a provider network and configured to function as an edge router in the provider network;
   identifying, by the networking device, a first device associated with the first traffic processing service, wherein the first device is located in a cloud services center and connected to the networking device over a Layer 2 connection;
   configuring the networking device to receive a data unit, via the provider network, from a first customer device associated with the first customer;
   configuring the networking device to send the data unit, destined for a destination, received from the first customer device to the first device; and
   configuring the networking device to send the data unit to the destination after the unit is received from the first device.

20. The method of claim 19, further comprising:
   receiving a request to provide a second traffic processing service for the first customer;
   identifying a second device associated with the second traffic processing service, wherein the second device is located in the cloud services center and connected to the networking device over a Layer 2 connection;
   configuring the networking device to send the data unit, received from the first device to the second device; and
   configuring the networking device to send the data unit to the destination after the data unit is received from the second device.

21. The method of claim 19, further comprising:
   receiving a request to provide a third traffic processing service for a second customer;
   identifying a third device associated with the third traffic processing service, wherein the third device is located in the cloud services center and connected to the networking device over a Layer 2 connection;
   configuring the networking device to receive a second customer data unit, via the provider network, from a second customer device associated with the second customer; and
   configuring the networking device to send the second customer data unit received from the second customer device to the third device.

22. The method of claim 21, further comprising:
   generating a first routing instance for the first customer, wherein the first routing instance is used to send data units received from the first customer device to the first device; and
   generating a second routing instance for the second customer, wherein the second routing instance is used to send data units received from the second customer device to the third device.

23. The method of claim 19, wherein configuring the networking device to receive data units from the first customer device associated with the first customer includes:
   configuring the networking device to use at least one of:
      a public multi-protocol label switching (MPLS) transport;
      a public Internet Protocol (IP) Generic Routing Encapsulation (GRE) tunnel;
      a public IP Protocol Security (IPSec) tunnel;
      a public IP IPSec tunnel over a Layer 3 Virtual Private Network (L3VPN);
      a private IP Virtual Local Area Network (VLAN) L3 interface;
      a private IP GRE tunnel over L3VPN;
      a private IP IPSec tunnel over L3VPN;
      a secure gateway VLAN L3 interface;
      a VLAN tagged Layer 2 (L2) interface;
      a Converged Packet Access (CPA) VLAN tagged L2 interface;
      a CPA VLAN tagged L3 interface;

a CPA GRE tunnel over L3VPN;
a CPA IPSec tunnel over L3VPN; or
a CPA VLAN tagged L2 interface.

24. The method of claim 19, wherein configuring the networking device to receive the data unit from the first customer device associated with the first customer includes:
selecting an access method for the customer;
determining a customer separation configuration based on the selected access method; and
configuring the service aggregator to include the determined customer separation configuration.

25. The method of claim 19, wherein configuring the networking device to receive the data unit from the first customer device associated with the first customer includes:
determining an access interface configuration based on the selected access method; and
configuring an access interface, associated with the customer, based on the determined access interface configuration.

26. A method performed by a networking device, comprising:
storing, by the networking device, information identifying a sequence of traffic processing services that are to be applied to data units associated with a customer;
receiving, by the networking device, a data unit associated with the customer;
identifying, by the networking device, a first device, associated with a first traffic processing service, based on the sequence of traffic processing services associated with the customer;
sending, by the networking device, the data unit to the first device;
receiving, by the networking device, the data unit from the first device;
sending, by the networking device, the data unit to a second device, associated with a second traffic processing service, based on the sequence of traffic processing services associated with the customer;
receiving, by the networking device, the data unit from the second device; and
sending, by the networking device, the data unit to a destination device, in response to receiving the data unit from the second device.

27. The method of claim 26, wherein the data unit associated with the customer is routed through the networking device differently from another data unit associated with another customer.

28. The method of claim 26, wherein identifying the first device, associated with the first traffic processing service, based on the sequence of traffic processing services associated with the customer, includes:
accessing a routing instance associated with the customer.

29. The method of claim 26, wherein receiving the data unit associated with the customer includes:
receiving the data unit from a customer device via a data tunnel; and wherein sending the data unit to the first device includes:
sending the data unit to a cloud services center over a Layer 2 connection.

\* \* \* \* \*